US006863452B2

(12) United States Patent
Takada

(10) Patent No.: US 6,863,452 B2
(45) Date of Patent: Mar. 8, 2005

(54) OPTICAL LINK DEVICE

(75) Inventor: Koji Takada, Kanagawa (JP)

(73) Assignee: Sony Corporation (JP)

( * ) Notice: Subject to any disclaimer, the term of this patent is extended or adjusted under 35 U.S.C. 154(b) by 86 days.

(21) Appl. No.: 10/350,226

(22) Filed: Jan. 24, 2003

(65) Prior Publication Data
US 2003/0147602 A1 Aug. 7, 2003

(30) Foreign Application Priority Data
Feb. 1, 2002 (JP) .................................. P2002-025030

(51) Int. Cl.[7] .............................................. G02B 6/36
(52) U.S. Cl. ....................................................... 385/93
(58) Field of Search .............................. 385/93, 92, 94, 385/76

Primary Examiner—Chau N. Nguyen
(74) Attorney, Agent, or Firm—Rader, Fishman & Grauer PLLC; Ronald P. Kananen

(57) ABSTRACT

An optical link device is provided with an optical communications package including a device positioning member, a photoelectric converter placed on the device positioning member, and leads for connecting contact terminals of the photoelectric converter with an external device; a sealing cap attached to the device positioning member and which seals the photoelectric converter; a condenser lens for guiding incident light to a photo detector (the photoelectric converter) or an optical fiber; a housing in which at least the optical communications package, the condenser lens and the sealing cap are placed; a receptacle for being coupled with the housing as well as the optical connector; a sleeve into which the optical fiber is inserted; a stopper against which the tip of the optical fiber is butted and for positioning the optical fiber. The sealing cap, the condenser lens, and the stopper are formed in a single unit member.

38 Claims, 21 Drawing Sheets

OPTICAL LINK DEVICE

CROSS REFERENCE TO RELATED APPLICATIONS

The present document claims priority to Japanese Priority Document JP 2002-025030, filed in the Japanese Patent Office on Feb. 1, 2002, the entire contents of which are incorporated herein by reference to the extent permitted by law.

BACKGROUND OF THE INVENTION

1. Field of the Invention

The present invention relates to an optical link device. More specifically, the present invention relates to an optical link device which performs data communications via an optical fiber by being connected to an optical connector.

2. Description of the Related Art

There are optical devices which perform data communications via an optical fiber by being connected to an optical connector.

An example of a conventional optical link device is described below with reference to FIG. 25.

The optical link device a includes a housing b and a receptacle c connected to the housing b.

The housing b has the shape of a box, the inside of which is formed as an internal space d, and includes an opening on one side.

The receptacle c has the shape of a box with an opening on one side and includes a bottom surface e and a side wall f that stands on the circumferential edge of the bottom surface e. A cylindrical sleeve holder section g, which protrudes in the same direction as the side wall f, is provided on the bottom surface e. The circumferential section of the bottom surface e is attached to the edges of the opening of the housing b, and the internal space d of the housing b is closed by the receptacle c.

A cylindrical sleeve h is fitted inside the sleeve holder section g of the receptacle c. The sleeve h may be formed with materials that allow for high precision machining, such as ceramic or metal materials.

A stopper i, placed in the internal space d of the housing b, is attached to the bottom surface e of the receptacle c. The stopper i is formed in the shape of a cylinder that is short in its axial direction and a center aperture is formed as a light transmissive aperture j. The central axis of the sleeve h attached to the inside of the sleeve holder section g of the receptacle c and the central axis of the light transmissive aperture j are in agreement.

A substantially cylindrical holder ring k is attached to the stopper i. A lens holder 1 is attached to the holder ring k so as to fit therein.

The lens holder 1 may be formed with a metal material and includes a cylinder section m and a closing section n, which closes an opening on one end of the cylindrical section m. A light transmissive aperture o is formed at a center section of the closing section n. The cylinder section m of the lens holder 1 is attached to the holder ring K.

A sealing cap p formed with a metal material is placed inside the lens holder 1.

An optical communications package q includes a device positioning member r, which is called a stem and is formed with a metal material, leads s, one end of each of which is attached to the device positioning member r, and a photoelectric converter (a photo detector or a light emitting device) t. Contact terminals of the photoelectric converter t are connected to the leads.

The photoelectric converter t is sealed in an airtight manner by having the sealing cap p attached to the device positioning member r. One end of the lens holder 1 is attached to the device positioning member r such that the lens holder 1 covers the sealing cap p. By having the photoelectric device t sealed in an airtight manner by the sealing cap p, condensation caused by changes in the surrounding temperature, for example, may be prevented, and the reliability of the operation of the photoelectric device t may be improved.

The sealing cap p and the device positioning member r, as well as the lens holder 1 and the device positioning member r, are joined together through resistance welding in a nitrogen atmosphere.

A spherical condenser lens u is placed between the lens holder 1 and the sealing cap p. The condenser lens u is aligned with the light transmissive aperture o of the lens holder 1.

Part of the leads s of the optical communications package q protrudes outward from the housing b to connect the contact terminals of the photoelectric converter t with a connector of an external device, such as a personal computer.

An optical connector v to be connected to the optical link device a—includes an optical fiber x supported by a connector section w. The optical fiber x has the tip covered by a ferrule y. A biasing spring z is placed between the connector section w and the ferrule y.

The optical connector v is coupled with the receptacle c by having the connector section w fitted therein. At this point, the ferrule y is inserted and fitted inside the sleeve h. The tip surface of the ferrule y inserted into the sleeve h butts against the stopper i. The biasing spring c presses the ferrule y against the stopper i. As the ferrule y butts against the stopper i, the tip of the optical fiber x is aligned with one end of the light transmissive aperture j of the stopper i.

In order to achieve good optical coupling, it is necessary that the positioning of the photoelectric converter t, the condenser lens u and the optical fiber x be adjusted in the optical link device a—in other words, it is necessary that their axes be aligned. This alignment is accomplished by, for example, adjusting the position of the holder ring k with respect to the stopper i on a surface orthogonal to the optical axis, and by adjusting the position of the lens holder 1 with respect to the holder ring k along the optical axis. Once the alignment is completed, the holder ring k is secured to the stopper i, and the lens holder 1 is secured to the holder ring k using, for example, a yttrium aluminum garnet (YAG) laser for instantaneous and firm welding.

When an optical signal is transmitted through the optical fiber x under a condition where the optical connector v is connected to the optical link device a, the transmitted optical signal enters the condenser lens u via the light transmissive aperture j of the stopper i and the light transmissive aperture o of the lens holder 1, and is received by the photoelectric converter (the photo detector) t. The optical signal received by the photoelectric converter t is converted into an electrical signal and is input to an external device through the leads s, thereby performing data transmission.

If, on the other hand, the photoelectric converter t of the optical communications package q is a light emitting device, an electrical signal from an external device is input to the photoelectric converter t via the leads s, is converted into an optical signal by the photoelectric converter t, and is emitted towards the condenser lens u. The optical signal that enters the condenser lens u is input to the optical fiber x via the light transmissive aperture o in the lens holder 1 and the light transmissive aperture j in the stopper i. Data transmission from an external device is thus performed.

The optical link device a described above is designed to either transmit data or receive data. However, there are devices which have both the functions of data transmission and reception as shown in FIG. 26.

This optical link device a' for both transmission and reception includes a pair of sleeve holders g, g, which are spaced apart from each other, provided in a receptacle c'. Inside the sleeve holders g, g are fitted sleeves h, h, respectively. Stoppers i, i are attached to the receptacle c' so as to be adjacent to each other, and holder rings k, k are attached to the stoppers i, i, respectively. Lens holder 1, l are attached to the holder rings k, k, respectively. The lens holder 1, l and sealing caps p, p, which are placed inside the lens holder 1, l, are attached to one optical communications package q, which functions as a receiver, and another optical communications package q, which functions as a transmitter, respectively.

The optical communications package q that functions as a receiver includes a photo detector as a photoelectric converter t, and the optical communications package q that functions as a transmitter includes a light emitting device as its photoelectric converter t.

An optical connector v' to be connected to the optical link device a' includes optical fibers x, x supported by a connector section w. The tips of the optical fibers x, x are covered by ferrules y, y, respectively. Biasing springs z, z are placed between the connector section w and the respective ferrules y, y.

SUMMARY OF THE INVENTION

In the conventional optical link device a, even when variances in the characteristics of the photoelectric converter t or the condenser lens u occur or when errors in the positioning of the photoelectric converter t or the condenser lens u occur, in order to make it possible to carry out assembly in accordance with the characteristics and the positioning of the photoelectric converter t or the condenser lens u, the position of the holder ring k and the lens holder 1 are adjusted for alignment such that variances and errors in the assembly phase for each component of the optical link device a are eliminated.

However, with the optical link device a, because such alignment procedures are carried out, there lies a problem in that not only is the component count higher, but also in that more work is required in aligning and thereafter securing the various parts.

In addition, in order to make it possible to perform alignment over as wide an area as possible, expensive ceramic and metal materials, which allow for high precision machining and can take complex shapes, need to be used for the various parts, thus resulting in an increase in manufacturing costs.

Furthermore, positioning of the optical fiber x is performed by butting the ferrule y against the stopper i, and there exists between the optical fiber x and the condenser lens a layer of atmosphere having a refractive index that differs significantly from the refractive index of the optical fiber x. Normally, the refractive index of an optical fiber made of quartz is 1.45 times that of the atmosphere. Some of the light that tries to enter the optical fiber x is reflected at the surface of the optical fiber x, and therein lies a danger in that due to the effects of the reflected light, the operation of the photoelectric converter t becomes unstable.

On the other hand, the optical link device a' includes the optical communications package q that functions as the receiver, and the optical communications package q that functions as the transmitter, thereby aiming to improve the ease of use. However, because the transmitter side and the receiver side are built independently, and because each side includes the stopper i, the holder ring k, the lens holder 1, the sealing cap p and the like, there lies a problem in that the component count becomes higher, and in that more work is required in aligning and thereafter securing the various components.

In addition, both the coupling of the sealing cap p and the device positioning member r, as well as the coupling of the lens holder 1 and the device positioning member r are carried out through welding in both the optical link device a and the optical link device a'. Thus, manufacturing costs become higher because a large scale assembly facility would be required and because materials for the sealing cap p, the lens holder 1, and the device positioning member r are limited to expensive metal materials.

The optical link device of the present invention addresses the issues described above by facilitating a more efficient assembly process.

An embodiment of the optical link device of the present invention includes an optical link device to which an optical connector formed such that an optical fiber is supported by a connector section may be connected, the optical link device including: an optical communications package including a device positioning member having prescribed wiring patterns and on which a photoelectric converter, which is either a light emitting device or a photo detector, is placed, as well as leads for connecting contact terminals of the photoelectric converter to an external device; a sealing cap that is attached to the device positioning member of the optical communications package and that seals the photoelectric converter in an airtight manner; a condenser lens that guides incident light to the photo detector or to the optical fiber; a housing in which at least the optical communications package, the condenser lens, and the sealing cap are placed; a receptacle that is coupled with the housing and with which the connector section of the optical connector is coupled; a sleeve into which the optical fiber is inserted when the receptacle and the connector section are coupled; a stopper for positioning the optical fiber by having the tip of the optical fiber inserted into the sleeve butt thereagainst. The sealing cap, the condenser lens, and the stopper are formed as a single unit member. It is to be noted that the following description of the advantages and modifications relate to this embodiment unless otherwise stated.

As a result, the component count can be reduced, while, at the same time, significantly reducing the amount of work required in positioning the photoelectric converter, the condenser lens and the optical fiber, in other words, the work required in the aligning and thereafter securing the various components.

In addition, because of the reduced component count, there is no need to carry out positioning over a wide range, and resin materials may be substituted for ceramic materials or metal materials which allow for high precision machining and which can take complex shapes. As a result, overall manufacturing costs can be reduced.

Furthermore, because the optical fiber is positioned by butting the optical fiber against the stopper of the single unit member, in which the sealing cap, the stopper and the condenser lens are unitized, there does not exist between the optical fiber and the single unit member a layer of atmosphere, the refractive index of which differs significantly from that of the optical fiber. Therefore, light is not reflected at the contacting surface between the optical fiber and the single unit member. Adverse effects of the reflected light on the photoelectric converter are thus minimized, and operation of the photoelectric converter becomes more stable.

Furthermore, by having the sleeve and the receptacle be separate units, a material that would allow for high precision machining may be used for the sleeve, thereby minimizing misalignment of the optical fiber resulting from attaching and detaching the optical connector, and securing good optical coupling characteristics for the optical link device.

In a modification of the embodiment above, an attachment section is provided on the single unit member, and the single unit member is attached to the housing by way of this attachment section. As a result, when the optical connector is coupled with the optical link device, the pressure from the optical fiber would not reach a joint between the single unit member and the optical communications package. Thus, misalignment of the optical communications package with respect to the single unit member as well as detachment therefrom can be prevented.

In another modification of the embodiment above, by having the sleeve holder that holds the sleeve unitized with the receptacle, the component count may be further reduced.

In another modification of the embodiment above, the housing and the receptacle are unitized, and thus the component count may be reduced, while, at the same time, significantly reducing the amount of work involved in aligning and thereafter securing the various parts.

In another modification of the embodiment above, the sleeve and the receptacle are unitized, and thus the component count may be reduced, while, at the same time, significantly reducing the amount of work involved in aligning and thereafter securing the various parts.

In another modification of the embodiment above, the single unit member and the sleeve are unitized, and thus the component count may be reduced, while, at the same time, significantly reducing the amount of work involved in aligning and thereafter securing the various parts.

In another modification of the embodiment above, the single unit member and the device positioning member of the optical communications package are formed using resin materials, and the sealing cap of the single unit member and the device positioning member are fused together. Compared with a case where the single unit member and the optical communications package are welded, fusing does not require as large scale an assembly facility, and enables a significant reduction in manufacturing costs for the optical link device.

In addition, in this case, since expensive metal materials that allow for high precision machining are not used for the single unit member or the optical communications package, a wider choice of materials may be used, and manufacturing costs can be reduced.

Furthermore, by joining the parts through fusing, the strength of fixation can be improved, and an optical link device with better environmental tolerance, especially with respect to temperature and humidity, may be provided.

Because fusing imposes less external stress on the single unit member and the optical communications package during the joining process, the optical characteristics may be expected to be more stable.

In another modification of the embodiment above, the single unit member and the device positioning member of the optical communications package are formed using resin materials, and the sealing cap of the single unit member and the device positioning member are joined together using a hot melt adhesive. Compared with a case where the single unit member and the optical communications package are joined through welding, as large scale an assembly facility is not required, and manufacturing costs for the optical link device can be reduced significantly.

In addition, in this case, since expensive metal materials that allow for high precision machining are not used for the single unit member or the optical communications package, a wider choice of materials are available, and manufacturing costs can be reduced.

Furthermore, by joining the parts through fusing, the strength of fixation can be improved, and an optical link device with better environmental tolerance, especially with respect to humidity and temperature, may be provided.

Because the hot melt adhesive is solid at room temperature, it is easy to handle and provides for better work efficiency.

In another modification of the embodiment above, the joint between the single unit member and the device positioning member of the optical communications package is sealed by a sealing material, thereby further enhancing environmental tolerance, especially with respect to temperature and humidity.

In another modification of the embodiment above, the single unit member and the device positioning member of the optical communications package are each provided with a butting section, and these butting sections are butted against each other, and the sealing cap of the single unit member and the device positioning member are joined at portions other than the butting sections. As a result, the surface of contact where the two butting sections meet each other becomes a surface of reference during joining. Thus, even when the joint is fused, the relative positions of the single unit member and the optical communications package with respect to the axis of the light that is emitted from or enters the photoelectric converter would remain unchanged, and good optical characteristics would thus be ensured.

Another embodiment of the optical link device of the present invention includes an optical link device for being connected with an optical connecter formed such that a pair of optical fibers is supported by a connector section, the optical link device including: an optical communications package that includes a device positioning member having prescribed wiring patterns and on which a photo detector and a light emitting device are placed as photoelectric converters, as well as leads for connecting contact terminals of the photo detector and the light emitting device with an external device; a sealing cap, which is attached to the device positioning member of the optical communications package, for sealing in an airtight manner the photo detector and the light emitting device; a pair of condenser lenses that guide incident light to the photo detector or to the optical fiber; a housing, in which at least the optical communications package, the pair of condenser lenses, and the sealing cap are placed; a receptacle for being coupled with the housing and with the connector section of the optical connector; a pair of sleeves into which the respective optical fibers are inserted when the connector section is coupled with the receptacle; a pair of stoppers, against which the tips of the optical fibers inserted into the respective sleeves are butted, that determine the positions of the pair of optical fibers. The sealing cap, the pair of condenser lenses, and the pair of stoppers are formed into a single unit member. It is to be noted that the following description of the advantages and modifications relate to this embodiment unless otherwise stated.

As a result, the component count is reduced, and the work involved in aligning the photoelectric converters, the condenser lenses, and the optical fibers, as well as in fixing their positions thereafter, is significantly reduced.

Because of the reduced component count, alignment over a wide range is no longer required, and since, as materials for the various parts, resin materials may be substituted for ceramic materials or metal materials that allow for high precision machining and which can take complex shapes, manufacturing costs may be reduced.

Further, because the positions of the optical fibers are determined by being butted against the stopper of the single unit member, in which the sealing cap, the stopper, and the condenser lenses are unitized, there exists between the optical fibers and the single unit member no layer of atmosphere, the refractive index of which is significantly different from that of the optical fibers. Therefore light is not reflected at the butting surface between the optical fibers and the single unit member, and adverse effects caused by reflected light on the photoelectric converters are prevented, thereby providing for more stable operations of the photoelectric converters.

Because the sleeve and the receptacle are formed as separate components, a material that would allow for high precision machining can be used for the sleeve to help reduce misalignment of the axes of the optical fibers upon attachment and detachment of the optical connector. As a result, better optical coupling characteristics are achieved for the optical link device.

In a modification of the embodiment above, an attachment section is formed on the single unit member, and the single unit member is attached to the housing through the attachment section. As a result, when the optical connector is connected to the optical link device, the pressure from the optical fibers does not reach the joint between the single unit member and the optical communications package. As a result, misalignment and detachment of the optical communications package with respect to or from the single unit member may be prevented.

In another modification of the embodiment above, the sleeve holder, which holds the sleeve, is unitized with the receptacle to further reduce the component count.

In another modification of the embodiment above, the housing and the receptacle are unitized, thereby reducing the component count, while, at the same time, significantly reducing the work involved in aligning and thereafter securing the various parts.

In another modification of the embodiment above, the sleeve and the receptacle are unitized, thereby reducing the component count, while, at the same time, significantly reducing the work involved in aligning and thereafter securing the various parts.

In another modification of the embodiment above, the single unit member and the sleeve are unitized to further reduce the component count and to significantly reduce the work involved in aligning and thereafter securing the various parts.

In another modification of the embodiment above, the single unit member and the device positioning member of the optical communications package are formed using resin materials, and the sealing cap of the single unit member and the device positioning member are joined through fusing. As compared to a case where the single unit member and the optical communications package are joined through welding, as large scale an assembly facility is not required, and manufacturing costs for the optical link device may be reduced significantly.

In addition, in this modification, because expensive metal materials that allow for high precision machining are not used for the single unit member or the optical communications package, a wider choice of materials is available, and manufacturing costs are reduced.

Further, because the various parts are joined through fusing, the strength of fixation thereof can be improved, while, at the same time, providing an optical link device with better environmental tolerance, especially with respect to humidity and temperature.

In addition, in this modification, fusing causes less external stress on the single unit member and the optical communications package during the joining, and provides for more stable optical characteristics.

In another modification of the embodiment above, the single unit member and the device positioning member of the optical communications package are formed using resin materials, and the sealing cap of the single unit member and the device positioning member are joined together using a hot melt adhesive. As compared to a case where the single unit member and the optical communications package are joined through welding, as large scale an assembly facility is not required, and manufacturing costs for the optical link device can be reduced significantly.

In addition, in this modification, because expensive metal materials that allow for high precision machining are not used for the single unit member or the optical communications package, a wider choice of materials is available, and manufacturing costs are reduced significantly.

Furthermore, the strength of fixation can be improved, and an optical link device with better environmental tolerance, especially with respect to humidity and temperature, can be provided.

Also, because the hot melt adhesive used in this modification is solid at room temperature, it is easy to handle, and provides for better work efficiency.

In another modification of the embodiment above, the joint between the single unit member and the device positioning member of the optical communications package is sealed using a sealing material, thereby achieving better environmental tolerance, especially with respect to temperature and humidity.

In another modification of the embodiment above, the single unit member and the device positioning member of the optical communications package each include a butting section, and these butting sections butt against each other, and the sealing cap of the single unit member and the device positioning member are joined at parts other than the buffing sections. As a result, a surface of contact, where the two butting sections butt against each other, becomes a surface of reference. Even when the joining parts are fused, the relative positions of the single unit member and the optical communications package with respect to the axis of the light emitted from or entering the photoelectric converter would remain unchanged, and good optical characteristics would thus be ensured.

Another embodiment of the optical link device of the present invention includes an optical link device for being connected to an optical connector formed such that an optical fiber is supported by a connector section, the optical link device including: an optical communications package that includes a device positioning member having prescribed wiring patterns and on which at least one of a light emitting device and a photo detector is placed as a photoelectric converter, as well as leads for connecting contact terminals of the photoelectric converter with an external device; a sealing cap for sealing the photoelectric converter airtight, the sealing cap being attached to the device positioning member of the communications package; a condenser lens that guides incident light to the photo detector or to the optical fiber; a housing in which at least the optical communications package, the condenser lens, and the sealing cap are placed; a receptacle that is connected to the housing and to which the connector section of the optical connector is connected; a sleeve into which the optical fiber is inserted when the receptacle and the connector section are coupled; and a stopper for determining the position of the optical fiber by having the tip of the optical fiber that is inserted in the sleeve butt thereagainst. The sealing cap and the device positioning member of the optical communications package are formed using resin materials and the sealing cap and the device positioning member are joined together through fusing. It is to be noted that the following description of the advantages and modifications relate to this embodiment unless otherwise stated.

Therefore, as compared to a case where the single unit member and the optical communications package are joined through welding, as large scale a facility is not required, and manufacturing costs for the optical link device may be reduced.

Because expensive metal materials that allow for high precision machining are not used for either the single unit member or the optical communications package, a wider choice of material is available, and manufacturing costs are reduced.

Further, by joining the parts through fusing, the strength of fixation thereof can be improved, while, at the same time, providing an optical link device with better environmental tolerance, especially with respect to temperature and humidity.

In addition, fusing imposes less external stress on the joint between the single unit member and the optical communications package, thereby providing for more stable optical characteristics.

In a modification of the embodiment above, the joint between the sealing cap and the device positioning member of the optical communications package is sealed using a sealing material, thereby improving environmental tolerance, especially with respect to temperature and humidity.

In another modification of the embodiment above, the sealing cap and the device positioning member of the optical communications package each include a butting section, and these butting sections are butted against each other. The sealing cap and the device positioning member are joined at parts other than the butting sections. As a result, a surface of contact, where the two butting sections meet, becomes a surface of reference. Even when the joint is fused, the relative positions of the single unit member and the optical communications package with respect to the axis of the light emitted from or entering the photoelectric converter would remain unchanged, and good optical characteristics would thus be ensured.

Another embodiment of the optical link device of the present invention includes an optical link device for being connected to an optical connector formed such that an optical fiber is supported by a connector section, the optical link device including: an optical communications package that includes a device positioning member having prescribed wiring patterns and on which at least one of a light emitting device and a photo detector used as a photoelectric converter is placed, as well as leads for connecting contact terminals of the photoelectric converter with an external device; a sealing cap for sealing the photoelectric converter device airtight and which is attached to the device positioning member of the communications package; a condenser lens that guides incident light to the photo detector or to an optical fiber; a housing in which at least the optical communications package, the condenser lens, and the sealing cap are placed; a receptacle that is connected to the housing and to which the connector section of the optical connector is connected; a sleeve into which the optical fiber is inserted when the receptacle and the connector section are coupled; and a stopper, against which the optical fiber that is inserted into the sleeve is butted, for determining the position of the optical fiber. The sealing cap and the device positioning member of the optical communications package are formed using resin materials, the sealing cap and the device positioning member are joined together using a hot melt adhesive. It is to be noted that the following description of the advantages and modifications relate to this embodiment unless otherwise stated.

Therefore, as compared to a case where the single unit member and the optical communications package are joined through welding, as large scale an assembly facility is not required, and manufacturing costs for the optical link device can be reduced significantly.

Because expensive metal materials that allow for high precision machining are not used for the single unit member or the optical communications package, a wider choice of materials is available, and manufacturing costs can be reduced significantly.

Furthermore, an improvement in the strength of fixation is achieved, and an optical link device having better environmental tolerance, especially with respect to temperature and humidity, is provided.

In addition, because the hot melt adhesive used in this embodiment is solid at room temperature, it is easy to handle and provides for better work efficiency.

In a modification of the embodiment above, the joint between the sealing cap and the device positioning member of the optical communications package is sealed using a sealing material, thereby providing for better environmental tolerance, especially with respect to temperature and humidity.

In another modification of the embodiment above, the sealing cap and the device positioning member of the optical communications package each include a butting section, and the butting sections are butted against each other, and the sealing cap and the device positioning member are joined at parts other than the butting sections. As a result, the surface of contact, where the two butting sections meet each other, becomes a surface of reference. Even when the joint is fused, the relative positions of the single unit member and the optical communications package with respect to the axis of the light emitted from or entering the photoelectric converter would remain unchanged, and good optical characteristics would thus be ensured.

These and further aspects and advantages of the present invention will become clearer in light of the following detailed description of the illustrative embodiments of this invention described in connection with the drawings.

BRIEF DESCRIPTION OF THE DRAWINGS

FIG. 1 is an enlarged sectional view of an optical link device prior to having an optical connector connected thereto;

FIG. 3 is an enlarged sectional view with a heat iron placed between the single unit member and the optical communications package;

FIG. 7 is an enlarged sectional view where the single unit member and the optical communications package are in contact with each other while the heat iron is brought closer from the sides;

FIG. 11 is an enlarged sectional view in which the hot melt adhesive is applied on a joint section of the optical communications package;

DETAILED DESCRIPTION OF THE PREFERRED EMBODIMENTS

Preferred embodiments of the optical link device of the present invention will be described with reference to the appended drawings.

The first embodiment will be described with reference to FIG. 1 through FIG. 13.

Figure 1:
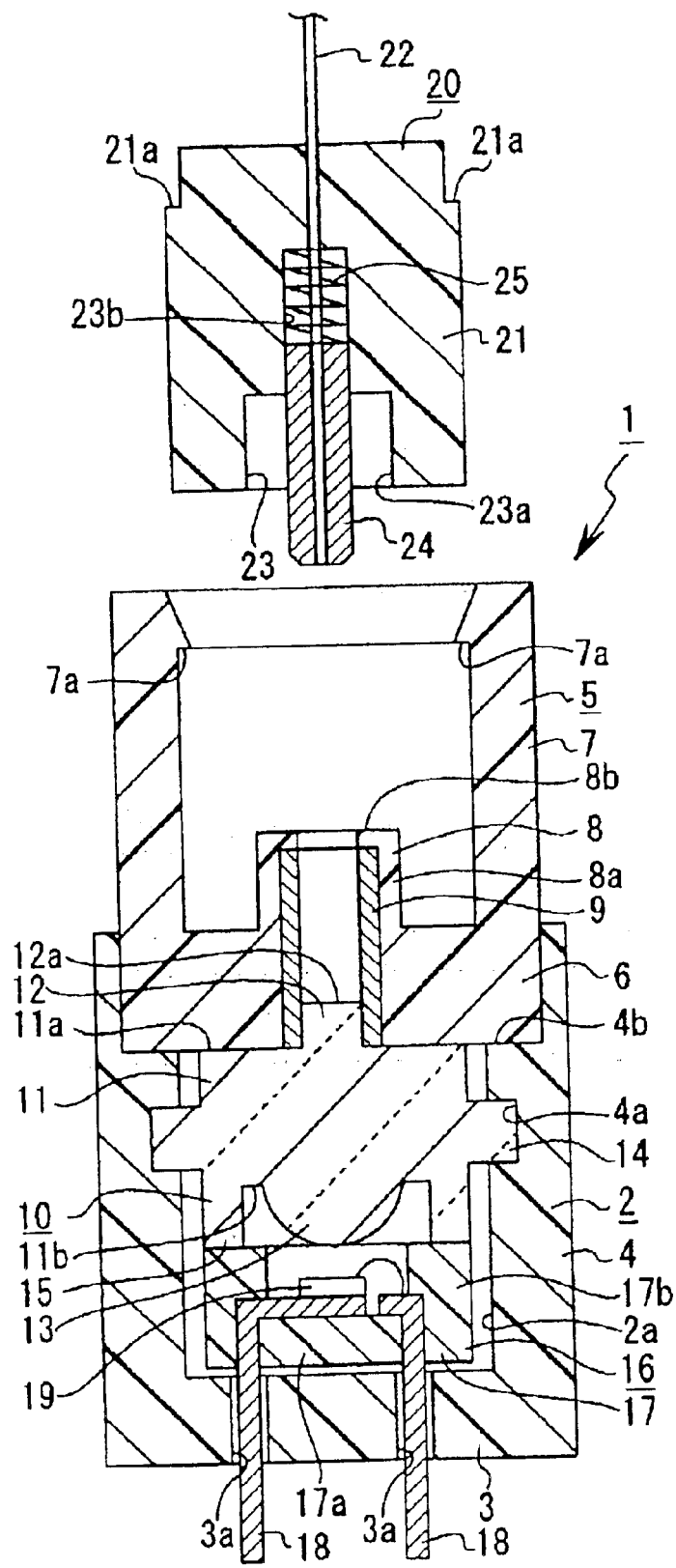
FIG. 1, along with FIG. 2 through FIG. 13, shows the first embodiment of the present invention, where
Figure 2:
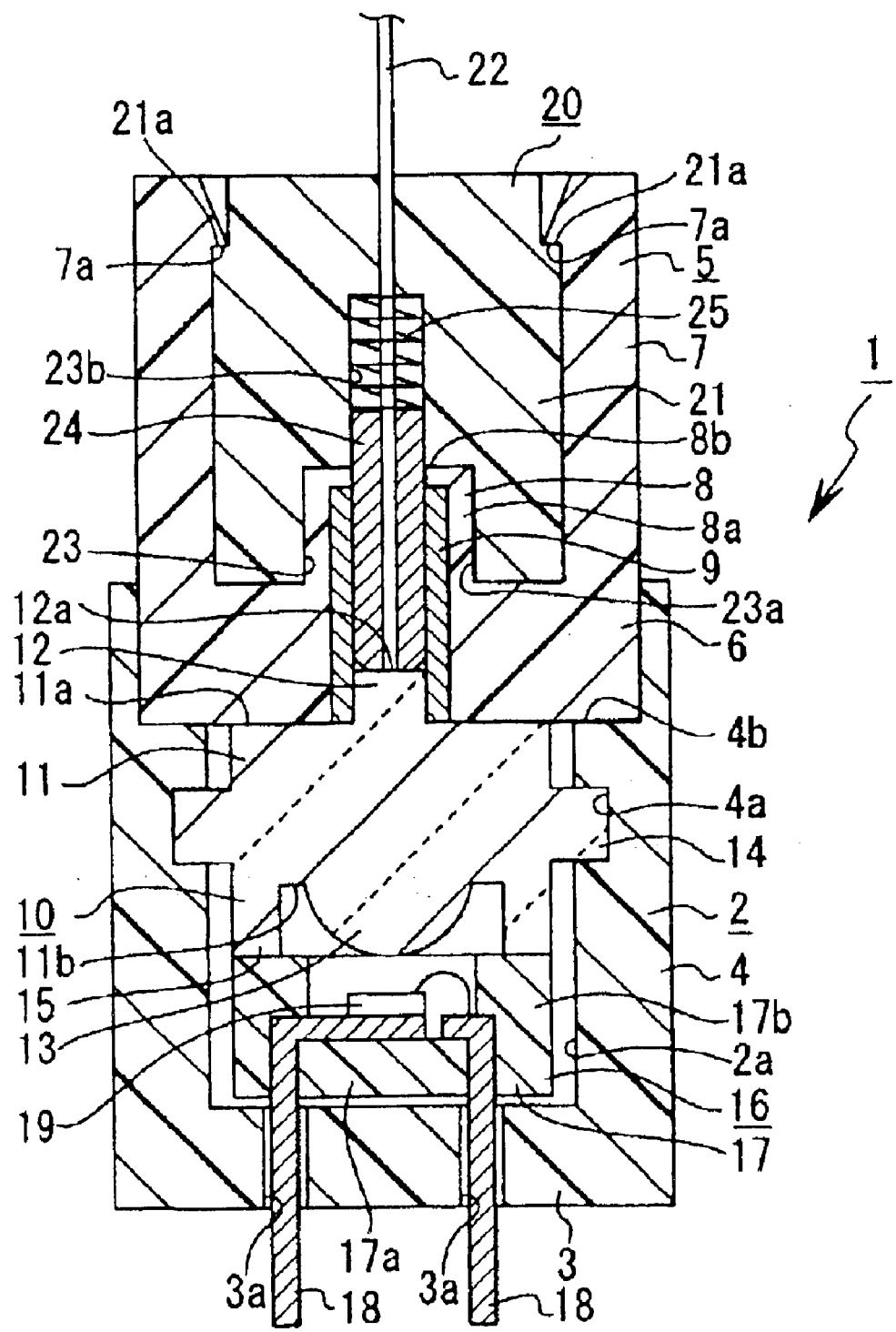
FIG. 2 is an enlarged sectional view of the optical link device after having the optical connecter connected thereto.

An optical link device 1 includes a housing 2. The housing 2 is formed with a resin material and includes a bottom section 3 and a circumferential wall section 4, which is provided so as to stand at the circumferential edge of the bottom section 3, as shown in FIG. 1 and FIG. 2. The housing 2 includes two separate halves, which are joined together, and an internal space 2a is formed therein.

The bottom section 3 has a plurality of insertion holes 3a, 3a.

An attachment groove 4a is formed on the inner surface of the circumferential wall section 4 towards the upper part of the circumferential wall section 4 and extends in the direction of the circumference. A fitting concave section 4b is formed at the tip portion of the circumferential wall section 4 and extends in the direction of the circumference.

A receptacle 5 is coupled with the housing 2. The receptacle 5 is formed with a resin material and includes a bottom section 6 and a side wall 7 provided so as to stand on the circumferential edge of the bottom section 6.

A substantially cylindrical sleeve holder 8 is unitized with the bottom section 6 and protrudes in the same direction as the side wall 7. The sleeve holder 8 includes a cylindrical circumference surface section 8a and an inner flange 8b, provided on one end of the circumference surface section 8a.

Engagement protrusions 7a, 7a are provided on the inner surface of the side wall 7 at the tip portion so as to be spaced apart along the circumference thereof.

The outer circumferential portion of the bottom section 6 is engaged with the fitting concave section 4b of the housing 2 and the receptacle 5 is attached thereto. As a result, the receptacle 5 closes the internal space 2a of the housing 2.

A cylindrical sleeve 9 is fitted inside the sleeve holder 8 of the receptacle 5. The sleeve 9 is formed with a material that allows for high precision machining, such as a ceramic material like zirconium oxide or a metal material like bronze. The inner diameter of the sleeve 9 is the same size as the inner diameter of the inner flange 8b of the sleeve holder 8 of the receptacle 5.

A single unit member 10 is placed in the internal space 2a of the housing 2. The single unit member 10 includes a sealing cap 11, a cylindrical stopper 12 that protrudes from a surface 11a on one end of the sealing cap 11, a condenser lens 13 that protrudes from another surface 11b on the other side of the sealing cap 11, and an attachment section 14 that protrudes from the side of the sealing cap 11 and extends in the direction of the circumference, all of which are formed into a single unit and with a transparent resin material. A resin material that has a high transmittance and good environmental tolerance, such as ZEONEX, a product of Zeon Corporation, or ARTON, a product of JSR Corporation, may be used for the single unit member 10. The sealing cap 11 includes a fixing section 15 that protrudes in the same direction as the condenser lens 13 from the circumferential edge of the surface 11b.

The central axis of the stopper 12 and the central axis (optical axis) of the condenser lens 13 are aligned. The tip of the stopper 12 is formed as a stopper surface 12a.

The attachment section 14 of the single unit member 10 is engaged with the attachment groove 4a of the housing 2, and the single unit member 10 is attached to the housing 2. The stopper 12 of the single unit member 10 is inserted and fitted inside the sleeve 9, and the surface 11a is in contact with the bottom section 6 of the receptacle 5.

In addition to the single unit member 10, an optical communications package 16 is placed in the internal space 2a of the housing 2.

The optical communications package 16 includes a device positioning member 17, which is called a stem and is formed with a resin material, leads 18, 18, one end of each of which is attached to the device positioning member 17, and a photoelectric converter 19, which may be a photo detector or a light emitting device. The device positioning member 17 includes a device positioning section 17a and a circumference surface section 17b provided so as to stand on the circumferential edge of the device positioning section 17a. Prescribed circuit patterns are formed on the device positioning section 17a. The leads 18, 18 are used for connecting contact terminals of the photoelectric converter 19 to an external device, such as a personal computer, and protrude partially outside the device positioning section 17a.

The fixing section 15 of the single unit member 10 is fixed to the circumference surface portion 17b of the device positioning member 17 by, for example, fusing. The single unit member 10 is fixed with the tip surface of the fixing section 15 butting against the tip surface of the circumference surface section 17b, and the photoelectric converter 19 is sealed in an airtight manner by having the single unit member 10 fixed to the device positioning member 17. By having the photoelectric converter device 19 sealed in an airtight manner by the single unit member 10, condensation due to changes in the surrounding temperature can be prevented, thereby improving the reliability of the operation of the photoelectric converter 19.

The optical communications package 16 is placed in the inner space 2a in the housing 2 with the single unit member 10 fixed in place. The leads 18, 18, which protrude outward from the device positioning member 17, protrude outside the housing 2 through the insertion holes 3a, 3a, respectively, in the bottom section 3. As the single unit member 10 is secured to the optical communications package 16, the photoelectric converter 19 is positioned opposite the condenser lens 13 of the single unit member 10.

An optical connector 20 to be connected to the optical link device 1, includes an optical fiber 22 supported by a connector section 21.

The connector section 21 includes notches 21a, 21a which are formed on one end of the connector section 21 and are spaced apart in the direction of the circumference. The connector section 21 also includes a support recess 23 opened on the other end. The support recess 23 has an insertion section 23a having a larger diameter, and a support section 23b having a smaller diameter.

The tip of the optical fiber 22 is covered by a ferrule 24. Part of the ferrule 24 is supported by the support section 23b of the support recess 23 so as to be freely slidable, and the tip of the ferrule 24 protrudes outward from the support recess 23. Thus, the optical fiber 22 is supported by the connector section 21 via the ferrule 24.

A biasing spring 25 is provided compressed in the support section 23b of the support recess 23. The biasing spring 25 biases the ferrule 24 in a direction such that the ferrule 24 protrudes from the connector section 21.

Steps for assembling the optical link device 1 will be described below.

First, the single unit member 10 is fused with and attached to the optical communications package 16 in, for example, a nitrogen atmosphere. The specific process for fusing will be described later. The positioning of the optical communications package 16 and the single unit member 10, in other words, the photoelectric converter 19 and the condenser lens 13, may be aligned by performing image recognition of the circuit pattern formed on the device positioning member 17 and taking the recognized image as a reference, or by performing image recognition of light emitted from the photoelectric converter (light emitting device) 19 and taking the recognized image as a reference.

Next, the optical communications package 16 and the single unit member 10, which have been joined together, are placed inside the housing 2. The attachment section 14 of the single unit member 10 is engaged with the attachment groove 4a in one of the halves of the housing 2, while the other half of the housing 2 is attached to the first half so as to cover the optical communications package 16 and the single unit member 10. The fixing of the attachment section 14 of the single unit member 10 to the housing 2, and the fixing of the two halves of the housing 2 are performed by way of, for example, fusing.

Next, the sleeve 9 is fitted to the stopper 12 of the single unit member 10.

Lastly, the receptacle 5 is attached to the housing 2 such that the sleeve holder 8 covers the sleeve 9. The receptacle 5 is secured to the housing 2 by engaging the bottom section 6 of the receptacle 5 with the fitting concave section 4b of the housing 2 through, for example, fusing. It is assumed herein that when the receptacle 5 is attached to the housing 2, the bottom section 6 of the receptacle 5 touches the sealing cap 11 of the single unit member 10.

The connector section 21 of the optical connector 20 is engaged with the receptacle 5, and the engagement protrusions 7a, 7a of the receptacle 5 are engaged with the notches 21a, 21a, respectively, of the connector section 21. At the same time, the ferrule 24 is inserted into the sleeve 9, and the tip surface of the inserted ferrule 24 butts against the stopper surface 12a of the stopper 12 of the single unit member 10. The tip surface of the ferrule 24 and the tip surface of the optical fiber 22 are pressed against the stopper surface 12a of the stopper 12 by the biasing spring 25. With the ferrule 24 inserted into the sleeve 9, the sleeve holder 8 of the receptacle 5 is inserted into the insertion section 23a of the connector section 21.

Thus, when an optical signal is transmitted through the optical fiber 22 with the optical connector 20 coupled with the optical link device 1, the transmitted optical signal enters the photoelectric converter (photo detector) 19 via the stopper 12, the sealing cap 11, and the condenser lens 13 of the single unit member 10. The optical signal which has thus entered the photoelectric converter 19 is converted into an electrical signal and is input to an external device via the leads 18, 18. Thus, data transmission to the external device is performed.

On the other hand, if the photoelectric converter 19 is a light emitting device, an external device would input an electrical signal to the photoelectric converter 19 via the leads 18, 18. The photoelectric converter 19 converts the electrical signal into an optical signal and emits the optical signal. The emitted optical signal enters the optical fiber 22 via the condenser lens 13, the sealing cap 11, and the stopper 12 of the single unit member 10, and thus, data transmission from the external device is carried out.

As described above, because the sealing cap 11, the stopper 12, and the condenser lens 13 are formed in a single unit in the single unit member 10 in the optical link device 1, fewer components are required. At the same time, the amount of work required in adjusting the position of the photoelectric converter 19, the condenser lens 13, and the optical fiber 22, in other words, the work required in aligning the various components, and securing them thereafter can be reduced significantly.

In addition, due to the fact that there are fewer components, there is no need to perform positioning over a wide range. Also, as the material for the various components, a resin material may be substituted for ceramic materials and metal materials that allow for high machining precision and which can take complex shapes. Thus, manufacturing costs can be reduced.

Further, because positioning of the optical fiber 22 is performed by having the ferrule 24 pressed against the stopper 12 of the single unit member 10, in which the sealing cap 11, the stopper 12, and the condenser lens 13 are formed in a single unit, there exists no layer of atmosphere having a refractive index that is significantly different from that of the optical fiber 22 between the optical fiber 22 and the single unit member 10. For this reason, light is not reflected at the surface where the ferrule 24 and the single unit member 10 meet, and adverse effects of reflected light on the photoelectric converter device 19 are prevented. As a result, the operation of the photoelectric converter 19 can be stabilized.

Furthermore, because the sleeve 9 and the receptacle 5 are provided as separate components, a material that would allow for high precision machining may be used for the sleeve 9 to reduce the likelihood of misalignment of the ferrule 24 resulting from attaching and detaching the optical connector 20, and good optical coupling characteristics can be secured for the optical link device 1.

In addition, because the receptacle 5 and the sleeve holder 8 are formed in a single unit, a further reduction in the component count can be achieved.

Further, because the attachment section 14 is provided on the single unit member 10, and the single unit member 10, which is joined to the optical communications package 16 by way of the attachment section 14, is attached to the housing 2, the pressure from the ferrule 24 at the time of coupling the optical connector 20 with the optical link device 1 is not carried to the joint between the single unit member 10 and the optical communications package 16, and thus, the optical communications package 16 may be prevented from becoming misaligned with respect to or detached from the single unit member 10.

Below, a method of joining the single unit member 10 and the optical communications package 16 will be described with reference to FIG. 3 through FIG. 13.

Firstly, joining the single unit member 10 and the optical communications package 16 through fusing will be described with reference to FIG. 3 through FIG. 6.

Figure 3:
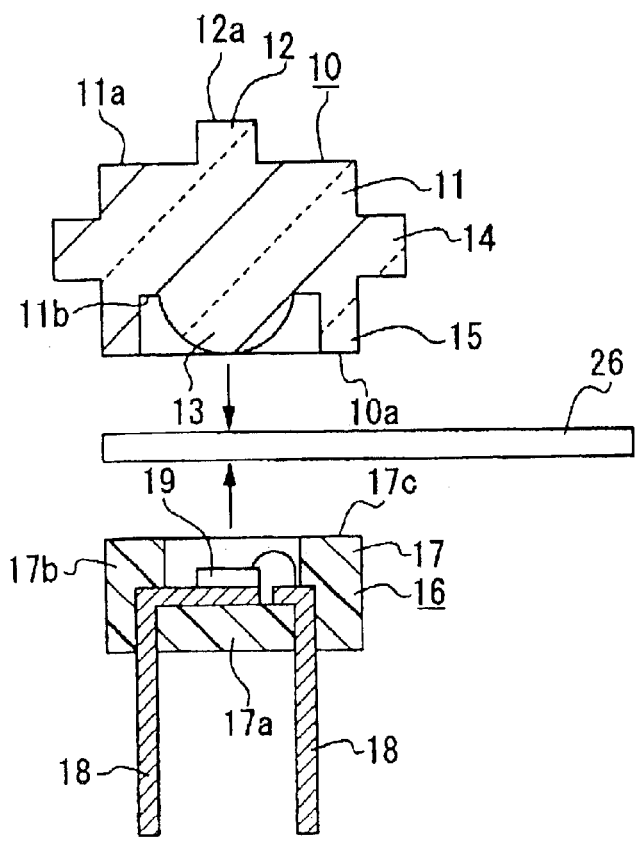
FIG. 3, along with FIG. 4 through FIG. 6, shows the steps for welding a single unit member and an optical communications package, where
Figure 4:
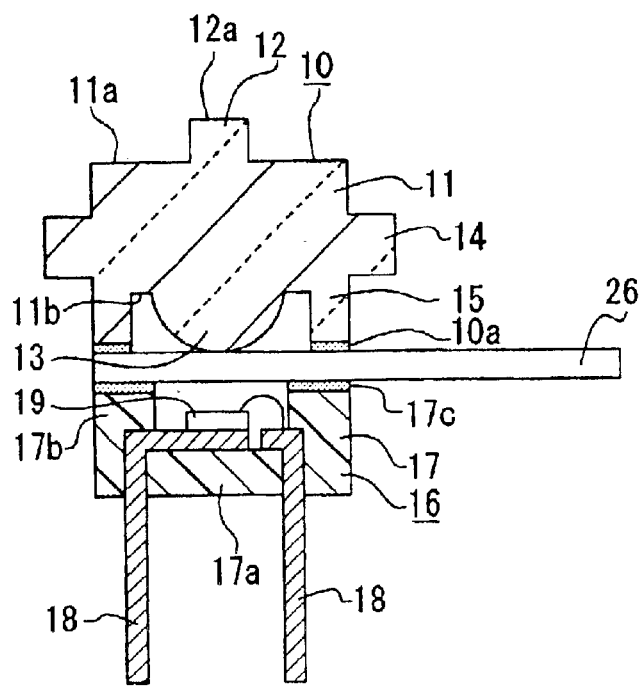
FIG. 4 is an enlarged sectional view where the heat iron is in contact with the single unit member and the optical communications package.
Figure 5:
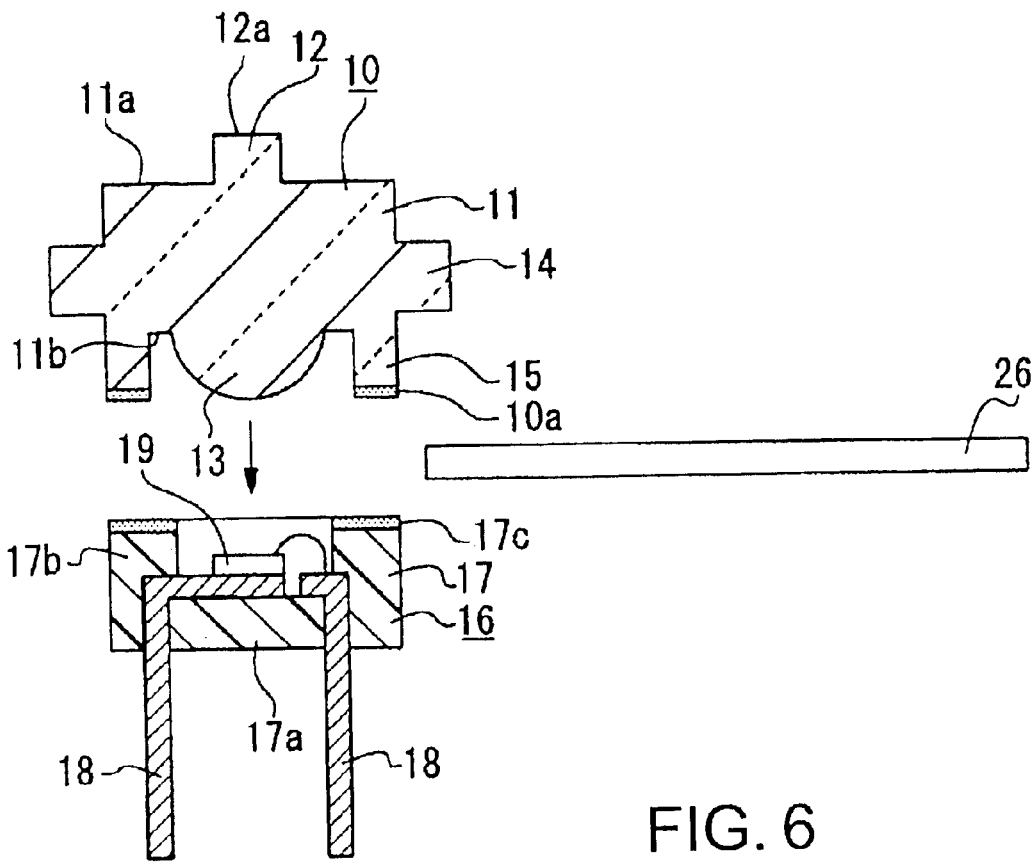
FIG. 5 is an enlarged sectional view in which the single unit member and the optical communications package are temporarily separated to take out the heat iron.
Figure 6:
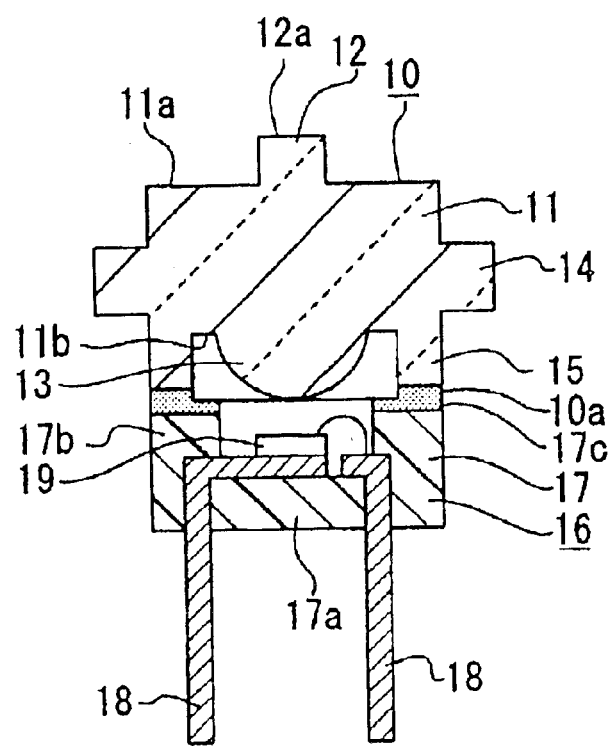
FIG. 6 is an enlarged sectional view in which the single unit member and the optical communications package are joined together.

A flat plate shaped heat iron 26 is placed between the single unit member 10 and the optical communications package 16, as shown in FIG. 3. The single unit member 10 and the optical communications package 16 are placed in contact with or close to the heat iron 26, and a joint 10a and a joint 17c of the single unit member 10 and the device positioning member 17 of the optical communications package 16, respectively, are melted as shown in FIG. 4. Then, the single unit member 10 and the optical communications package 16 are temporarily pulled apart, and the heat iron 26 is pulled out, as shown in FIG. 5. Finally, the joints 10a and 17c are placed in contact with each other to join the single unit member 10 and the optical communications package 16, as shown in FIG. 6.

In order to secure superior airtightness, the steps described above are performed in a nitrogen atmosphere.

Figure 7:
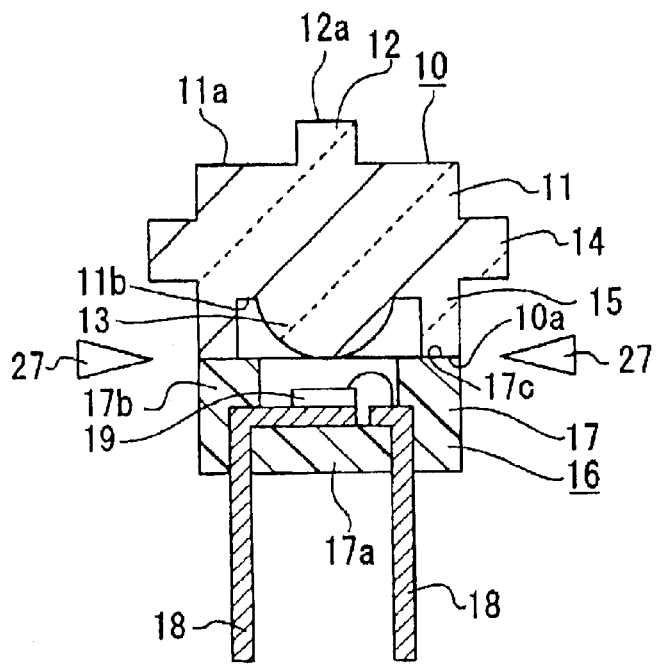
FIG. 7, along with FIG. 8, shows another process for fusing the single unit member and optical communications package.
Figure 8:
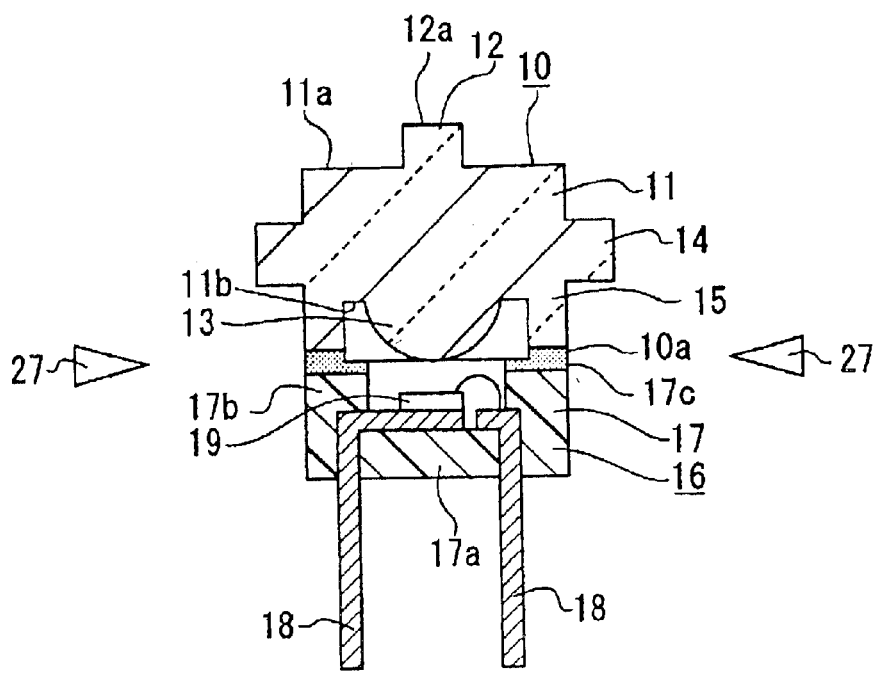
FIG. 8 is an enlarged sectional view where the heat iron is placed away from the single unit member and the optical communications package.

Alternatively, the following method of joining through fusing may also be adopted, as shown in FIG. 7 and FIG. 8 Firstly, the joints 10a and 17c of the single unit member 10 and the device positioning member 17 of the optical communications package 16, respectively, are placed in contact with each other, and heat irons 27, 27 are brought closer to the joints 10a and 17c from the sides in order to fuse and join them, as shown in FIG. 7. Once the joints 10a and 17c are fused and the joining of the joints 10a and 17c is completed, the heat irons 27, 27 are pulled away from the joints 10a and 17c, respectively, as shown in FIG. 8.

While in FIG. 3 through FIG. 8, methods of joining through fusing using the heat iron 26 or the heat irons 27, 27 are illustrated, the single unit member 10 and the optical communications package 16 may also be joined together by melting the joints 10a and 17c using hot air, high frequency induction heating, light irradiation, ultrasound, or a melting agent.

By thus joining the single unit member 10 and the optical communications package 16 through fusing, as compared to a case where the single unit member 10 and the optical communications package 16 are joined through welding, as large scale an assembly facility is not required, and manufacturing costs of the optical link device 1 may be reduced significantly.

In addition, because high cost metal materials that allow for high precision machining are not used for the single unit member 10 or the optical communications package 16, a wider choice of materials is available, thus providing for reduced manufacturing costs.

Furthermore, by joining the single unit member 10 and the optical communications package 16 through fusing, the strength of fixation can be improved, while, at the same time, providing an optical link device 1 having better environmental tolerance, especially with respect to humidity and temperature.

In addition, fusing imposes less external stress on the single unit member 10 and the optical communications package 16 at the time of joining, and helps stabilize the optical characteristics.

It is preferable, however, that the same material be used for both the single unit member 10 and the optical communications package 16 in order to enhance the strength of fixation.

Figure 9:
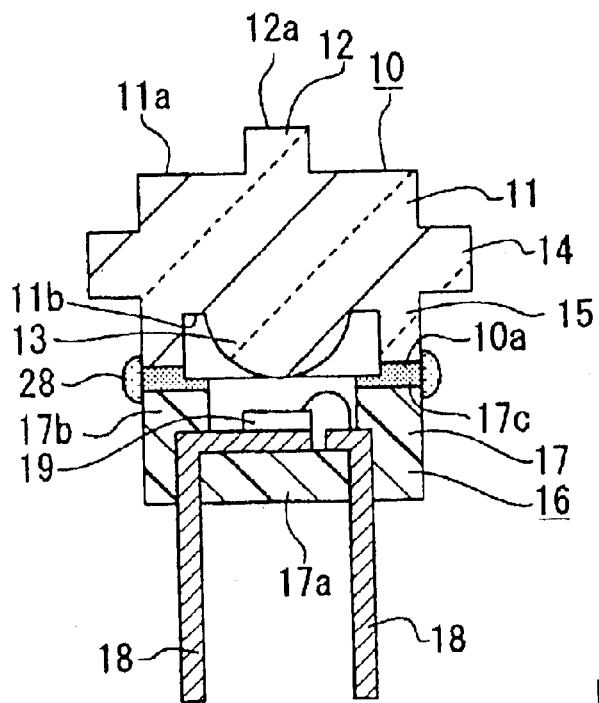
FIG. 9 is an enlarged sectional view where the joint between the single unit member and the optical communications package is sealed by a sealing material.

FIG. 9 shows an example where the single unit member 10 and the optical communications package 16 are joined and the joint is sealed using a sealing material 28. By thus sealing the joint with the sealing material 28, the environmental tolerance of the device can further be improved, especially with respect to humidity and temperature.

Figure 10:
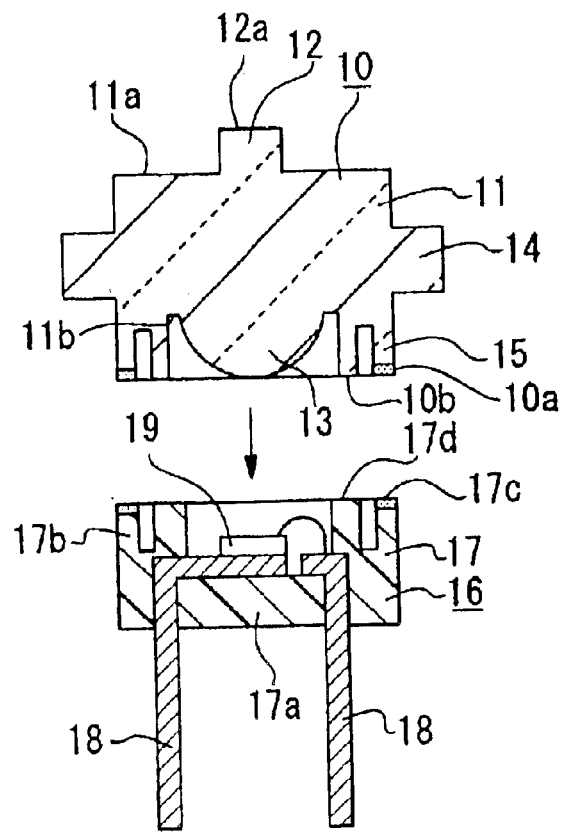
FIG. 10 is an enlarged sectional view where butting sections are provided on the single unit member and the device positioning member of the optical communications package to join them together.

FIG. 10 shows an example where butting sections 10b and 17d that are provided on the single unit member 10 and the device positioning member 17 of the optical communications package 16, respectively, at positions that are different from the positions of the joints 10a and 17c for joining the single unit member 10 and the optical communications package 16. The butting section 10b of the single unit member 10 is provided further inward than the joint 10a, and the butting section 17d of the device positioning member 17 is provided further inward than the joint 17c.

The single unit member 10 and the optical communications package 16 are joined together with the butting section 10b and the butting section 17d butting against each other. Therefore, a surface of contact where the butting section 10b and the buffing section 17d butt against each other becomes a surface of reference, and even when the joints 10a and 17c are fused, the relative positions of the single unit member 10 and the optical communications package 16 with respect to the axis of the light that is emitted from or enters the photoelectric converter 19 remain unchanged, thereby securing better optical characteristics.

Figure 12:
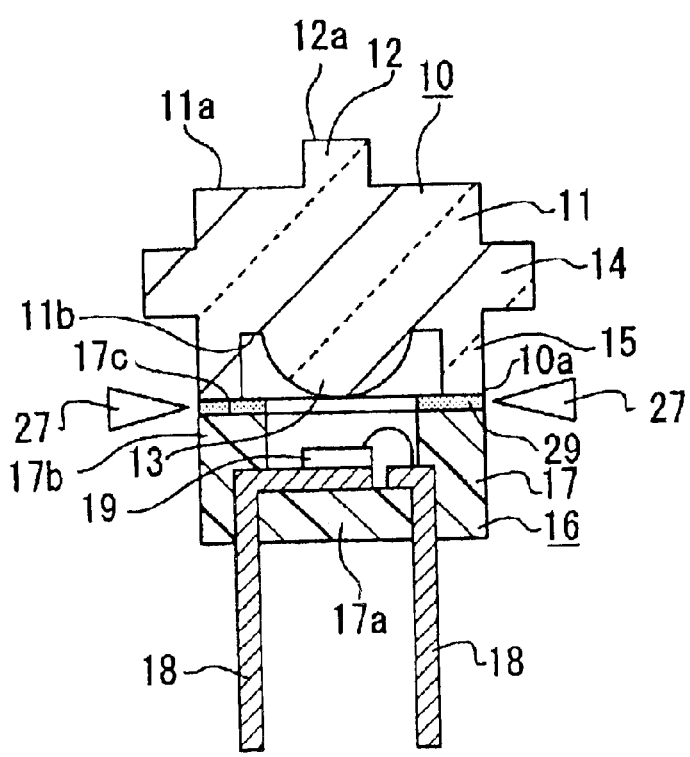
FIG. 12 is an enlarged sectional view where heat irons are brought closer from the sides to melt the hot melt adhesive.
Figure 13:
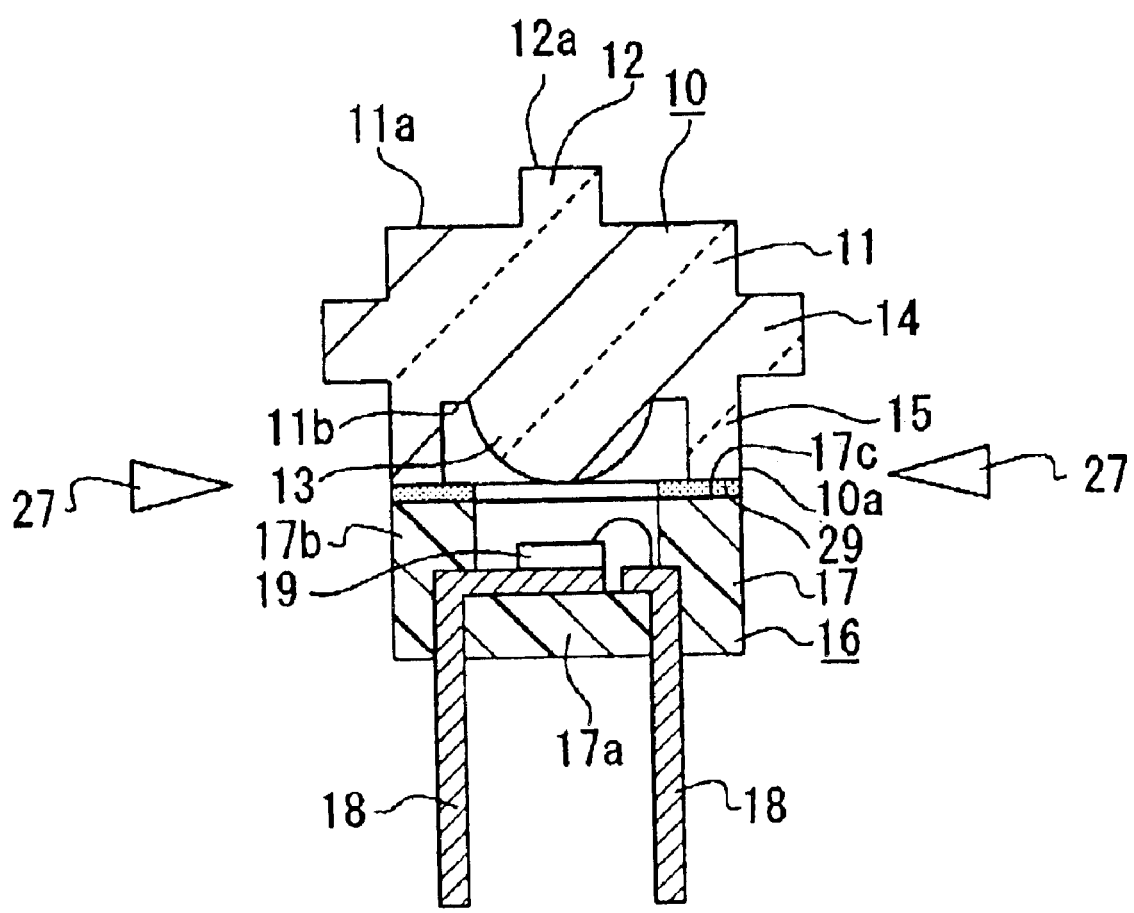
FIG. 13 is an enlarged sectional view where the single unit member and the optical communications package are joined together by removing the heat irons to cool the hot melt adhesive.

Next, a method of joining the single unit member 10 and the optical communications package 16 using a hot melt adhesive will be described with reference to FIG. 11 through FIG. 13.

A hot melt adhesive is a thermoplastic resin adhesive that is solid at room temperature and melts when heated.

Figure 11:
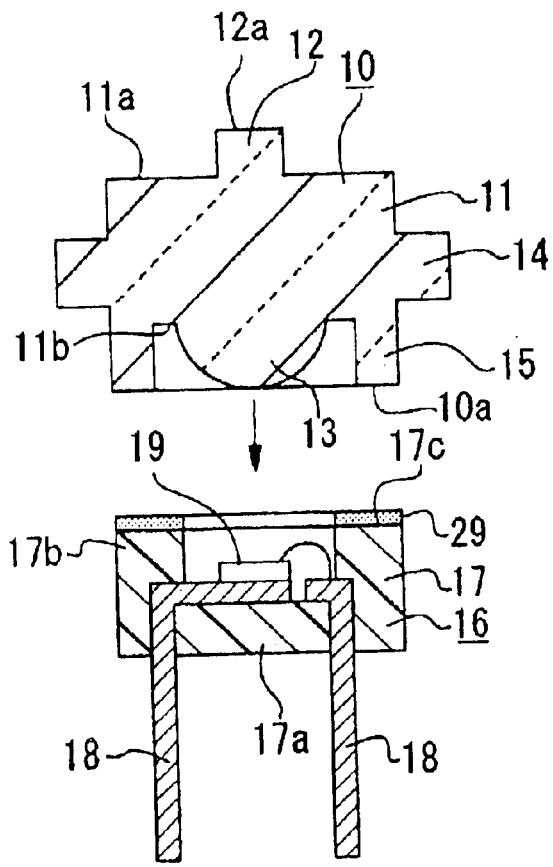
FIG. 11, along with FIG. 12 through FIG. 14, shows the steps for bonding the single unit member and the optical communications package using a hot melt adhesive, where

The hot melt adhesive 29 is applied on the joint 17c of the optical communications package 16, as shown in FIG. 11. Then, the joint 10a of the single unit member 10 is placed in contact with the joint 17c of the optical communications package 16 with the hot melt adhesive 29 in between, and the hot irons 27, 27 are brought closer to the joints 10a and 17c to melt the hot melt adhesive 29, as shown in FIG. 12. Once the hot melt adhesive 29 is melted, the heat irons 27, 27 are pulled away from the joints 10a and 17c to cool the hot melt adhesive 29, and the single unit member 10 and the optical communications package 16 are thus joined, as shown in FIG. 13.

By using the hot melt adhesive 29 in joining the single unit member 10 and the optical communications package 16, the strength of fixation can be improved, while, at the same time, providing an optical link device 1 having superior environmental tolerance, especially with respect to humidity and temperature.

Because the hot melt adhesive 29 is solid at room temperature, it is easy to handle, thus providing for higher efficiency.

As in the previous example, in the case described above where the single unit member 10 and the optical communications package 16 are joined using the hot melt adhesive, the joint may be sealed with the sealing material 28, and the butting sections 10b and 17d may also be provided and used in joining.

In FIG. 3 through FIG. 13, examples where the single unit member 10 and the optical communications package 16 are joined together through fusing or by using the hot melt adhesive 29 are shown. However, even in a case where the sealing cap is formed separate from the condenser lens and the like, it is possible to join the sealing cap and the optical communications package 16 through fusing or by using the hot melt adhesive 29.

Figure 14:
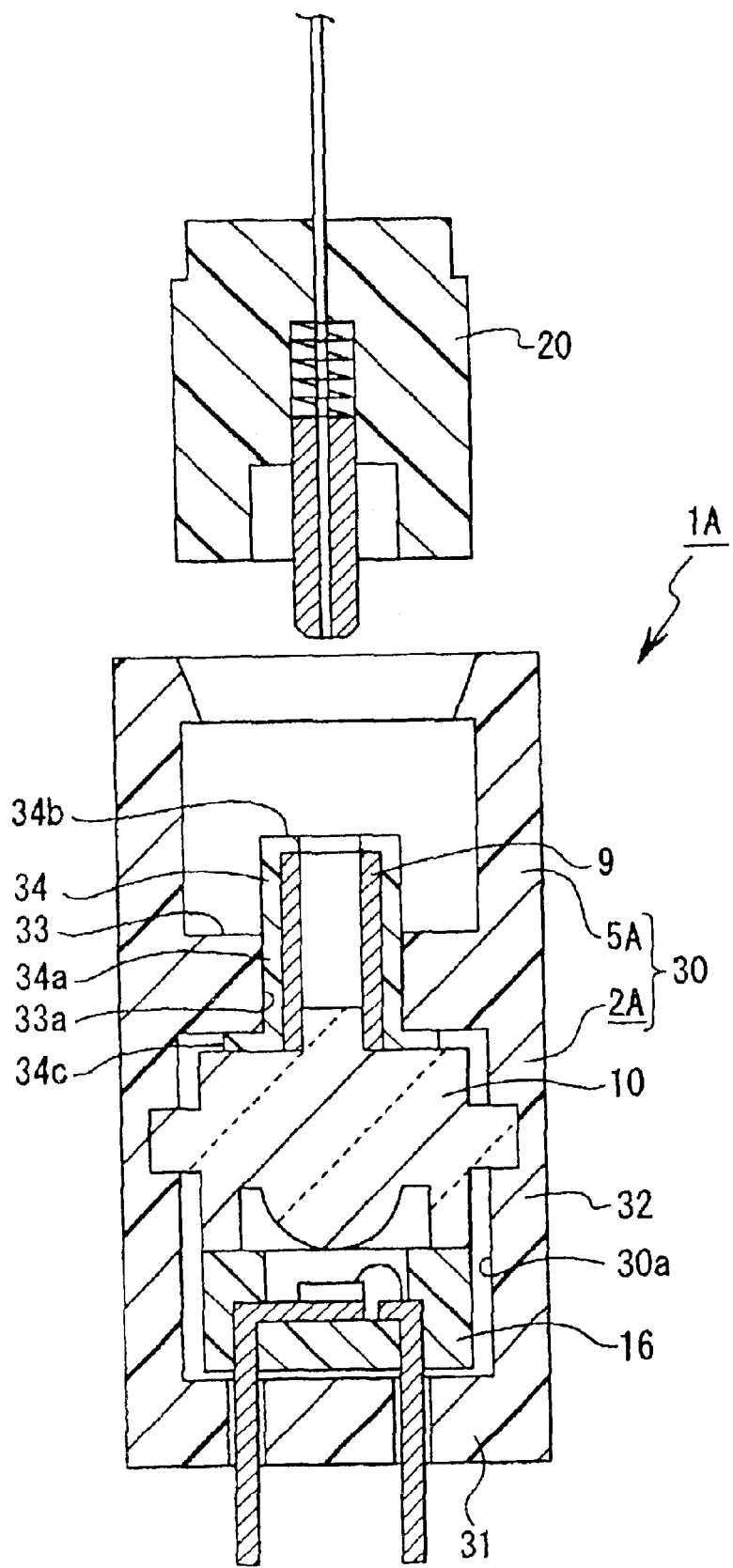
FIG. 14 is an enlarged sectional view of the second embodiment.

Next, the second embodiment will be described with reference to FIG. 14.

An optical link device 1A of the second embodiment described below differs from the optical link device 1 described earlier only in that the housing and the receptacle are formed in a single unit, and the receptacle and the sleeve holder are formed as separate units. For this reason, only the parts that differ from the optical link device 1 will be described in detail. Other parts will be assigned the same or similar reference numerals as those assigned to the corresponding parts in the optical link device 1 and description thereof will be omitted.

The optical link device 1A includes a housing 2A and a receptacle 5A which are unitized into a body 30 and formed using a resin material, and the body 30 includes a bottom section 31, a circumferential wall section 32 that is provided so as to stand on the circumferential edge of the bottom section 31, and a closing section 33 that protrudes inward from the circumferential wall section 32 around halfway up the circumferential wall section 32. The body 30 includes two separate halves that are joined together. A sleeve insertion hole 33a is opened in a center portion of the closing section 33.

A sleeve holder 34 is inserted and positioned in the sleeve insertion hole 33a. The sleeve holder 34 includes a cylindrical circumference surface section 34a, an inner flange 34b provided on one end of the circumference surface section 34a, and an outer flange 34c provided on the other end of the circumference surface section 34a. The sleeve holder is positioned by inserting the circumference surface section 34a inside the sleeve insertion hole 33a, and the outer flange 34c is positioned such that it is held between the sealing cap 11 of the single unit member 10 and the closing section 33 of the body 30.

A sleeve 9 is fitted inside the circumference surface section 34a of the sleeve holder 34.

As mentioned above, because the housing 2A and the receptacle 5A of the optical link device 1A are unitized as the body 30, the component count can be reduced, and the work involved in aligning and thereafter securing the various components can be reduced significantly.

Figure 15:
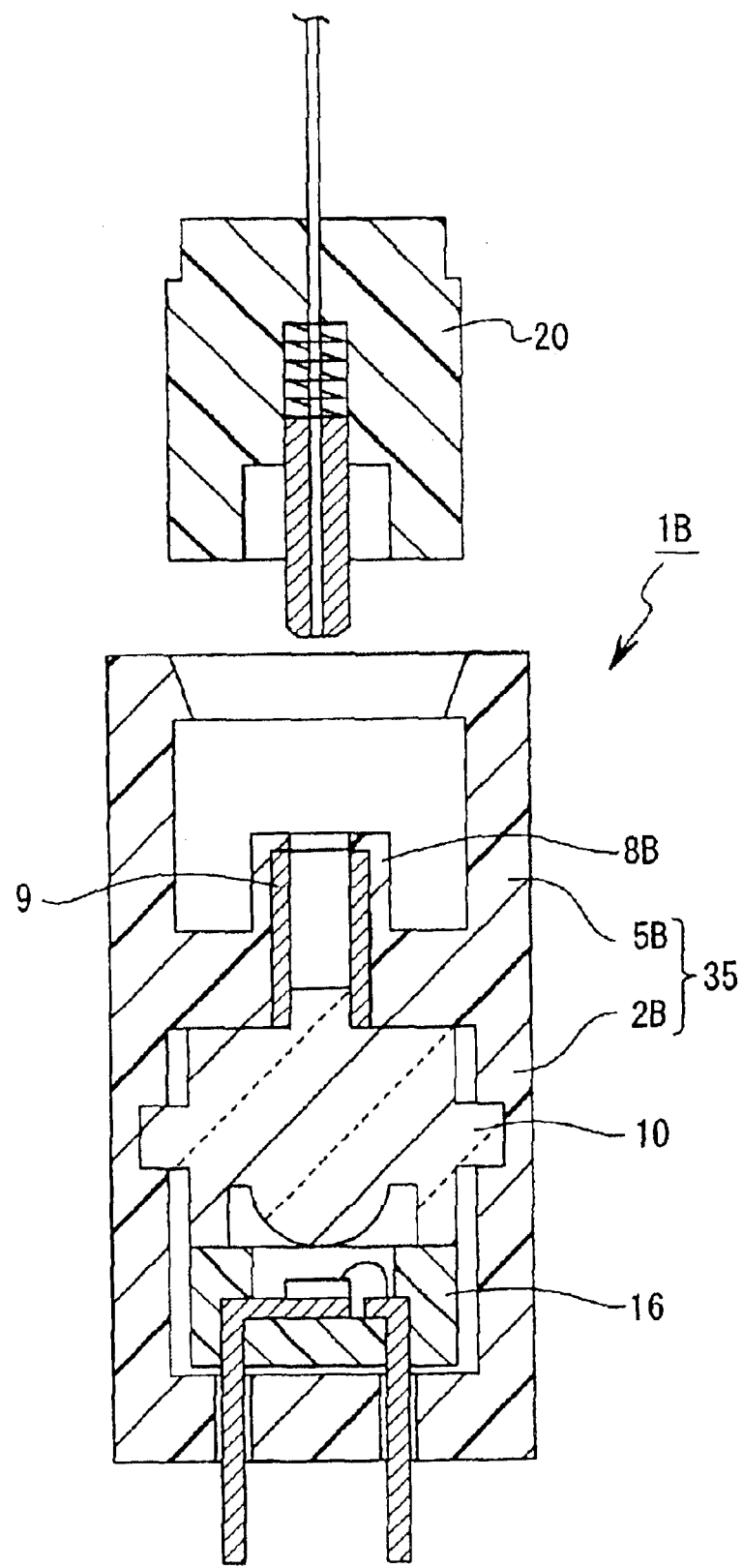
FIG. 15 is an enlarged sectional view of a modification of the second embodiment.

A modification of the second embodiment will be described next with reference to FIG. 15.

This modification, an optical link device 1B, includes a housing 2B, a receptacle 5B, and a sleeve holder 8B, which are formed with a resin material and which are unitized as a body 35. As a result, a further reduction in component count is made possible.

Figure 16:
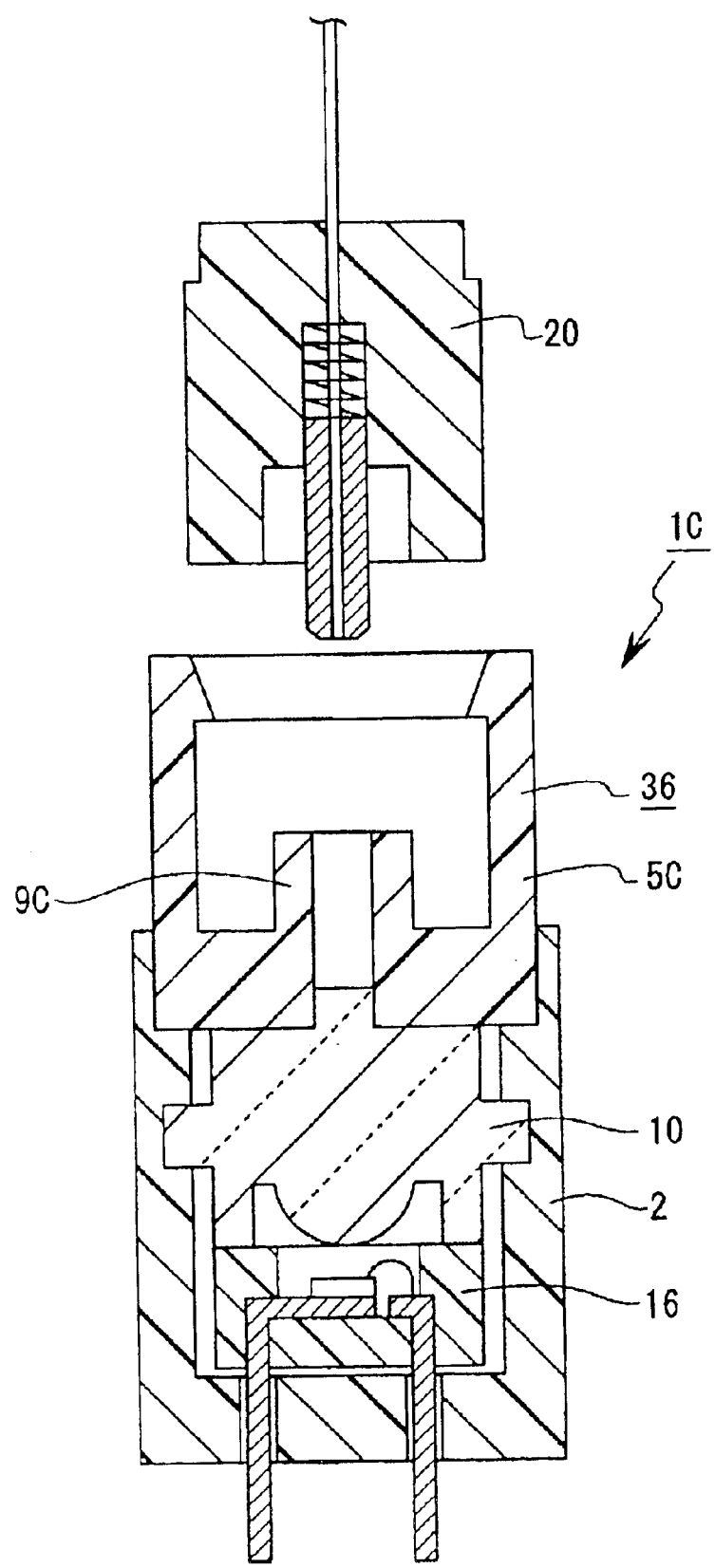
FIG. 16 is an enlarged sectional view of the third embodiment.

Next, a third embodiment will be described with reference to FIG. 16.

An optical link device 1C of the third embodiment differs from the optical link device 1 described earlier only in that the receptacle and the sleeve are formed in a single unit. Therefore, only the parts that differ from the optical link device 1 will be described in detail, while the other parts will be assigned the same reference numerals as those assigned to comparable parts of the optical link device 1, and description thereof will be omitted.

The optical link device 1C includes a receptacle 5C and a sleeve 9C that are formed with a resin material and are unitized into a sleeve integrated receptacle 36. For this reason, the optical link device 1C does not include a sleeve holder.

The inner diameter of the sleeve 9C is formed so as to be equal to the outer diameter of the stopper 12 of the single unit member 10, and the stopper 12 is fitted inside the sleeve 9C.

As mentioned above, because the receptacle 5C and the sleeve 9C are unitized in the sleeve integrated receptacle 36 in the optical link device 1C, the component count can be reduced, while, at the same time, reducing the work involved in aligning and thereafter securing the various parts.

Figure 17:
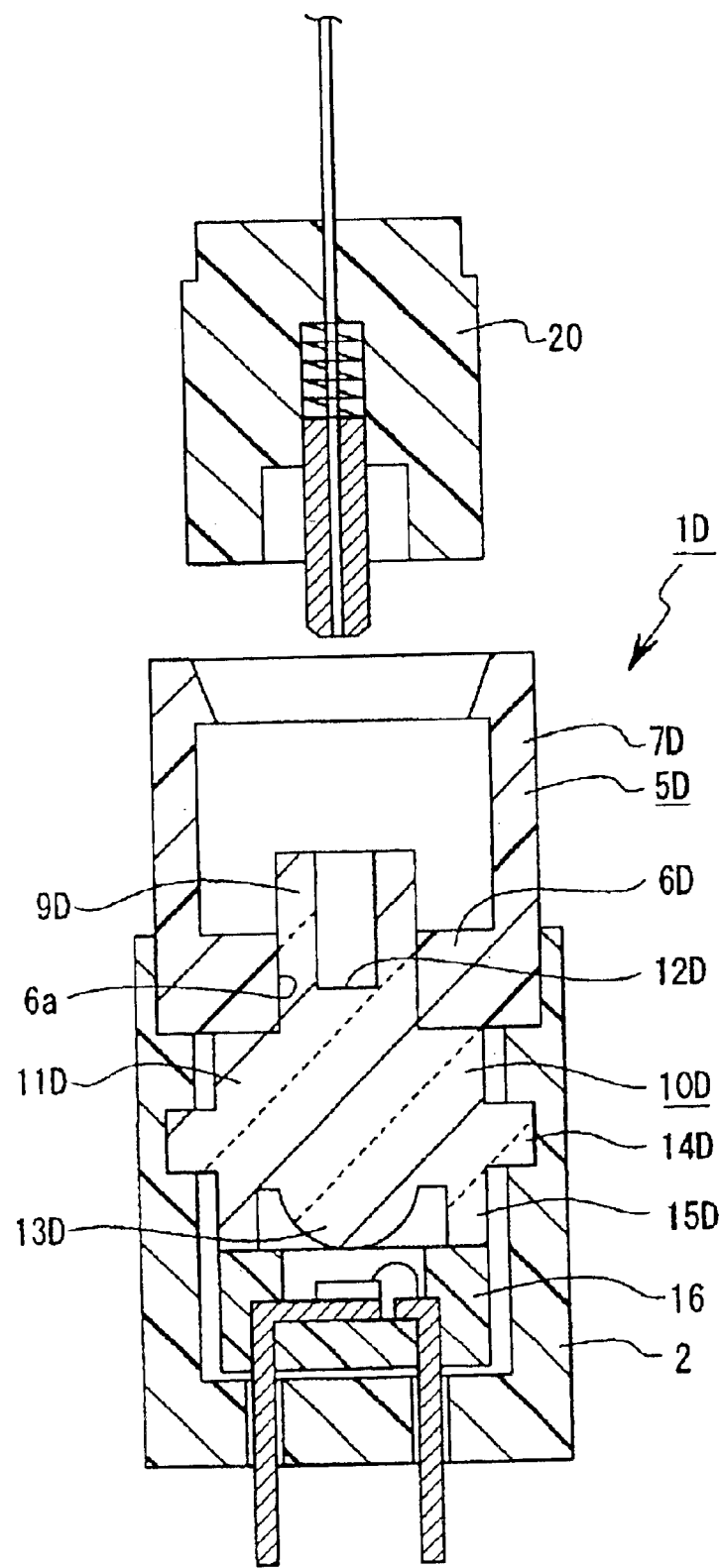
FIG. 17 is an enlarged sectional view of the fourth embodiment.

Next, a fourth embodiment will be described with reference to FIG. 17.

An optical link device 1D of the fourth embodiment described below differs from the optical link device 1 described earlier only in that the sealing cap, the stopper, the condenser lens, and the sleeve are formed in a single unit, and in that the receptacle does not include the sleeve holder. Therefore, only the parts that differ from the optical link device 1 will be described in detail, while the other parts will be assigned the same reference numerals as those assigned to comparable parts in the optical link device 1, and description thereof will be omitted.

The optical link device 1D includes a sealing cap 11D, a stopper 12D, a condenser lens 13D, a sleeve 9D, and an attachment section 14D, all of which are unitized as a single unit member 10D. The sleeve 9D extends from the stopper 12D. A fixing section 15D is provided on the sealing cap 11D.

The receptacle 5D includes a bottom section 6D and a side wall 7D provided so as to stand on the circumferential edge of the bottom section 6D. An insertion hole 6a is opened at a center portion of the bottom section 6D. The sleeve 9D of the single unit member 10D is inserted and positioned in the sleeve insertion hole 6a. Therefore, the optical link device 1D does not include a sleeve holder.

As described above, in the optical link device 1D, because the sealing cap 11D, the stopper 12D, the condenser lens 13D, and the sleeve 9D are unitized in the single unit member 10D in the optical link device 1D, the component count can be reduced, and the work involved in aligning and thereafter securing the various parts can be reduced significantly.

Figure 18:
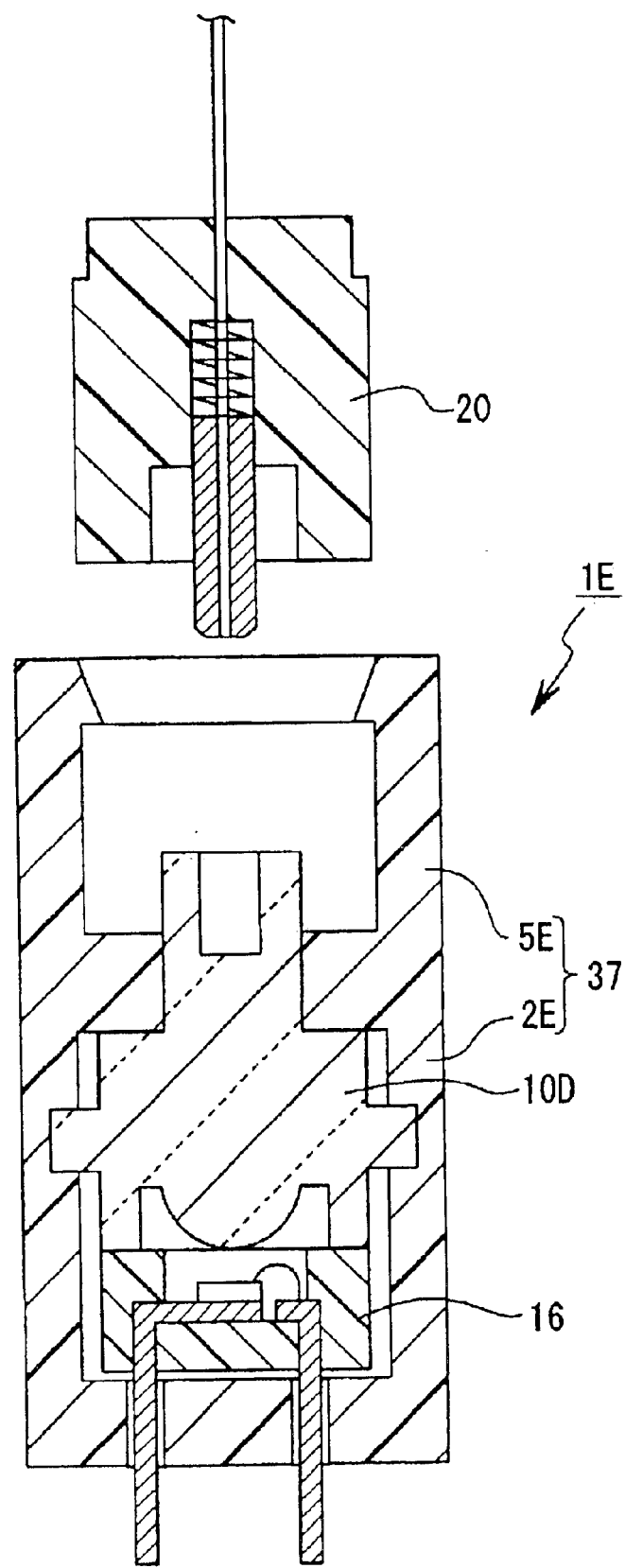
FIG. 18 is an enlarged sectional view of a modification of the fourth embodiment.

A variation of the fourth embodiment will be described next with reference to FIG. 18.

In an optical link device 1E of this variation, a housing 2E and a receptacle 5E are formed with a resin material and are unitized as a body 37. Therefore, a further reduction in component count is possible.

Figure 19:
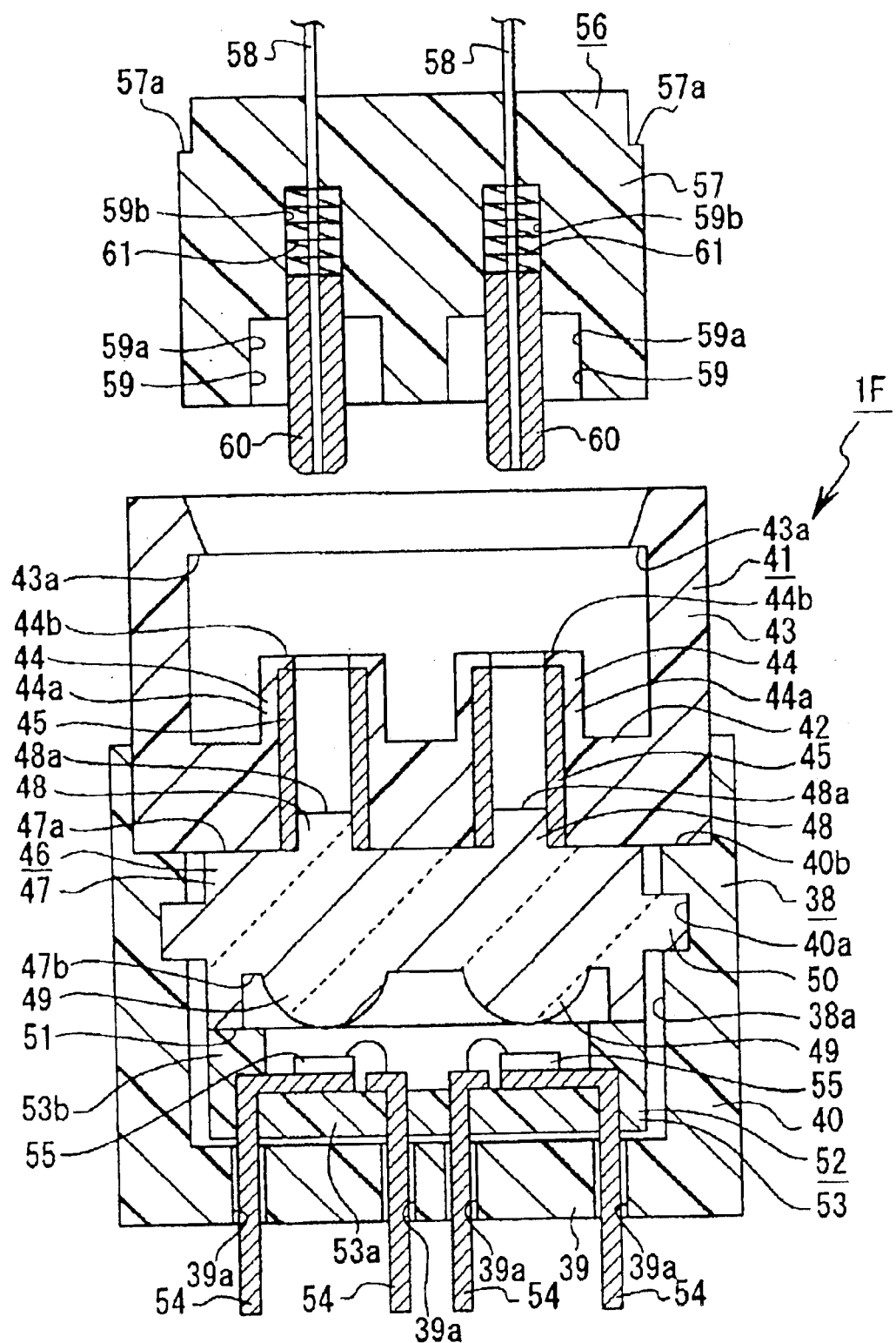
FIG. 19 is an enlarged sectional view of the fifth embodiment.

A fifth embodiment will be described next with reference to FIG. 19.

An optical link device 1F of the fifth embodiment is one in which the functions of the optical link device 1 of the first embodiment are expanded, and functions both as a receiver and a transmitter.

The optical link device 1F includes a housing 38, which is formed with a resin material and includes a bottom section 39 and a circumferential wall section 40 provided so as to stand on the circumferential edge of the bottom section 39. The housing 38 includes two separate halves that are joined together and the interior is formed as an internal space 38a.

A plurality of insertion holes 39a, 39a . . . are formed on the bottom section 39.

An attachment groove 40a is formed towards the tip of the inner side of the circumferential wall section 40 and extends in the direction of the circumference. A fitting concave section 40b is formed at the tip portion of the circumferential wall section 40 and extends in the direction of the circumference.

A receptacle 41 is coupled with the housing 38. The receptacle 41 is formed with a resin material and includes a bottom section 42 and a side wall 43 provided so as to stand on the circumferential edge of the bottom section 42.

Cylindrical sleeve holders 44, 44, which protrude from the bottom section 42 in the same direction as the side wall 43, are provided as part of the bottom section 42 but are spaced apart from each other. The sleeve holders 44, 44 each include a cylindrical circumference surface section 44a, and an inner flange 44b provided on one end of the circumference surface section 44a.

Engagement protrusions 43a, 43a are formed on the inner side of the tip portion of the side wall 43 such that they are spaced apart along the circumferential direction.

The outer circumference portion of the bottom section 42 of the receptacle 41 is fitted with the fitting concave section 40b of the housing 38, and the receptacle 41 closes the internal space 38a of the housing 38.

Cylindrical sleeves 45, 45 are fitted inside the sleeve holders 44, 44, respectively, of the receptacle 41. The sleeves 45, 45 are formed using a material that would allow for high precision machining, including, for example, a ceramic material, such as zirconium oxide and the like, or a metal material, such as phosphor bronze and the like. The inner diameter of the sleeves 45, 45 is made the same as the inner diameter of the flanges 44b, 44b of the sleeve holders 44, 44 of the receptacle 41.

A single unit member 46 is placed in the internal space 38a in the housing 38. The single unit member 46 includes a sealing cap 47; cylindrical stoppers 48, 48 that protrude from a surface 47a on one end of the sealing cap 47 and which are spaced apart from each other; condenser lenses 49, 49 that protrude from a surface 47b on the other end of the sealing cap 47 and which are spaced apart from each other; and an attachment section 50 that protrudes from a side surface of the sealing cap 47 and extends in the direction of the circumference, all of which are formed with a transparent resin material and as a single unit. Materials such as ZEONEX and ARTON may be used for the single unit member 46. The sealing cap 47 includes a fixing section 51 that protrudes from the circumferential edge of the surface 47b in the same direction as the condenser lenses 49, 49.

The central axes of the stoppers 48, 48 and the central axes of the condenser lenses 49, 49, respectively, are aligned. The tip surfaces of the stoppers 48, 48 are formed as stopper surfaces 48a, 48a.

The single unit member 46 is attached to the housing 38 by having the attachment section 50 of the single unit member 46 fitted with the attachment groove 40a of the housing 38. The stoppers 48, 48 of the single unit member 46 are inserted and fitted into the sleeves 45, 45, and the surface 47a is in contact with the bottom section 42 of the receptacle 41.

In addition to the single unit member 46, an optical communications package 52 is also placed in the internal space 38a in the housing 38.

The optical communications package 52 includes a device positioning member 53, which is called a stem and is formed with a resin material; leads 54, 54 . . . , one end of each of which is attached to the device positioning member 53; and a light emitting device and a photo detector provided as photoelectric converters 55, 55. The device positioning member 53 includes a device positioning section 53a and a circumference surface section 53b provided so as to stand on the circumferential edge of the device positioning section 53a, which are provided as a single unit. A prescribed circuit pattern is formed on the device positioning section 53a. The leads 54, 54, . . . are used for connecting contact terminals of the photoelectric converters 55, 55 with an external device, such as a personal computer or the like, and therefore part of each of the leads 54, 54, . . . protrudes outside of the device positioning section 53a.

The fixing section 51 of the single unit member 46 is fixed to the circumference surface section 53b of the device positioning member 53 through fusing or through adhesion using a hot melt adhesive. The single unit member 46 is fixed in place with the tip surface of the fixing section 51 butting against the tip surface of the circumference surface section 53b. By thus having the single unit member 46 fixed to the device positioning member 53, the photoelectric converters 55, 55 are sealed in an airtight manner. By having the photoelectric converters 55, 55 sealed airtight with the single unit member 46, condensation due to, for example, changes in the surrounding temperature may be prevented, thereby improving the reliability of the operation of the photoelectric converters 55, 55.

The optical communications package 52, with the single unit member 46 secured thereon, is placed in the internal space 38a in the housing 38, and the leads 54, 54, . . . that protrude outward from the device positioning member 53 are passed through the respective insertion holes 39a, 39a, . . . in the bottom section 39 of the housing 38 so as to protrude externally. With the single unit member 46 secured onto the optical communications package 52, the photoelectric converters 55, 55 are positioned such that they are opposite the respective condenser lenses 49, 49 of the single unit member 46.

The optical connector 56 to be connected to the optical link device 1F includes optical fibers 58, 58, which are supported by a connector section 57.

Notches 57a, 57a are formed on one end of the connector section 57 so as to be spaced apart along the direction of the circumference. Supportive recesses 59, 59 are formed in the connector section 57 and in isolation from each other. The supportive recesses 59, 59 include insertion sections 59a, 59a, respectively, of a larger diameter, and support sections 59b, 59b, respectively, of a smaller diameter.

The tips of the optical fibers 58, 58 are covered with ferrules 60, 60, respectively. For each of the ferrules 60, 60, a part thereof is supported by the support section 59b of the supportive recess 59 so as to be freely slidable. The tips of the ferrules 60, 60 protrude from the supportive recesses 59, 59. Thus, the optical fibers 58, 58 are supported by the connector section 57 by way of the respective ferrules 60, 60.

Basing springs 61 are stored compressed in each of the support sections 59b, 59b of the supportive recesses 59, 59, respectively. The biasing spring 61, 61 bias the ferrules 60, 60, respectively, outward from the connector section 57.

Steps for assembling the optical link device 1F will be described next.

Firstly, the single unit member 46 is attached to the optical communications package 52 in a nitrogen atmosphere by fusing or by adhesion using a hot melt adhesive. The procedures for fusing or for adhesion with a hot melt adhesive are similar to the procedures for the optical link device 1 of the first embodiment shown in FIG. 3 through FIG. 13.

The positioning of the optical communications package 52 and the single unit member 46, in other words, the photoelectric converters 55, 55 and the respective condenser lenses 49, 49, may be aligned by performing image recognition of the circuit pattern formed on the device positioning member 53 and using the recognized image as a reference, or by having the photoelectric converter 55 (the light emitting device) emit light, performing image recognition of the point of emission, and using the recognized image as a reference.

Next, the optical communications package 52 and the single unit member 46, which have been joined together, are placed inside the housing 38. The attachment section 50 of the single unit member 46 is fitted with the attachment groove 40a in one of the halves of the housing 38, and the other half of the housing 38 is attached to the first half so as to cover the optical communications package 52 and the single unit member 46. The securing of the attachment section 50 of the single unit member 46 to the housing 38 and the securing of the two halves of the housing 38 may be performed through, for example, adhesion.

Next, the sleeves 45, 45 are fitted with the respective stoppers 48, 48 of the single unit member 46.

Lastly, the receptacle 41 is attached to the housing 38 with the sleeve holders 44, 44 such that they cover the respective sleeves 45, 45. The receptacle 41 is secured onto the housing 38 by fitting the bottom section 42 of the receptacle 41 with the fitting concave section 40b of the housing 38, and then performing, for example, adhesion. When the receptacle 41 is attached to the housing 38, the bottom section 42 of the receptacle 41 comes in contact with the sealing cap 47 of the single unit member 46.

The optical connector 56 is coupled with the receptacle 41 by fitting the connector section 57 into the receptacle 41 and by engaging the engagement protrusions 43a, 43a of the receptacle 41 with the respective notches 57a, 57a of the connector section 57. At the same time, each of the ferrules 60, 60 is inserted into the corresponding sleeve 45 and the tip surface of each of the inserted ferrules 60, 60 butts against the stopper surface 48a of the corresponding stopper 48 of the single unit member 46. The biasing springs 61, 61 press the tip surfaces of the ferrules 60, 60 and the tip surfaces of the optical fibers 58, 58 against the respective stopper surfaces 48a, 48a of the stoppers 48, 48. As the ferrules 60, 60 are inserted into the respective sleeves 45, 45, the sleeve holders 44, 44 of the receptacle 41 are also inserted into the respective insertion sections 59a, 59a of the connector section 57.

With the optical connector 56 and the optical link device 1F thus coupled, when an optical signal is transmitted through one of the optical fibers 58, 58, the transmitted optical signal passes through the respective stopper 48, the sealing cap 47, and the condenser lens 49 of the single unit member 46, and enters the photoelectric converter 55 (photo detector). The optical signal entering the photoelectric converter 55 is converted into an electrical signal, which is in turn input to an external device via the leads 54, 54, and thus data transmission with the external device is performed.

On the other hand, when an electrical signal is input from an external device via the leads 54, 54 to the photoelectric converter 55 (light emitting device), the photoelectric converter 55 converts the electrical signal into an optical signal and emits the optical signal from the photoelectric converter 55. The emitted optical signal enters the optical fiber 58 via the respective condenser lens 49, the sealing cap 47, and the stopper 48 of the single unit member 46, and data transmission from the external device is thus performed.

As mentioned above, the sealing cap 47, the pair of stoppers 48, 48, and the pair of condenser lenses 49, 49 are all unitized into the single unit member 46 in the optical link device 1F, and the section that functions as the receiver and the section that functions as the transmitter are not divided into separate structures. For this reason, the component count can be reduced, and the work involved in positioning the photoelectric converters 55, 55, the condenser lenses 49, 49, and the optical fibers 58, 58, in other words, the work involved in aligning and thereafter securing the various parts can be reduced significantly.

In addition, due to the reduced component count, an alignment across wide ranges is not necessary, and for the various parts, resin materials may be substituted for ceramic materials or metal materials that allow for high precision machining and which can take complex shapes. As a result, manufacturing costs can be reduced.

Furthermore, because positioning of the optical fibers 58, 58 is performed by butting the ferrules 60, 60 against the respective stoppers 48, 48 of the single unit member 46, in which the sealing cap 47, the stoppers 48, 48, and the condenser lenses 49, 49 are formed in a single unit, there exists no layer of atmosphere, the index of refraction of which would be significantly different from that of the optical fibers 58, 58, between the optical fibers 58, 58 and the single unit member 46. Therefore light is not reflected at the surface where the ferrules 60, 60 are butted against the single unit member 46, thereby preventing adverse effects of reflected light on the photoelectric converters 55, 55, and stabilizing the operation of the photoelectric converters 55, 55.

Furthermore, the sleeves 45, 45 are separate from the receptacle 41, and a material that would allow for high precision machining may be used for the sleeves 45, 45, thereby minimizing misalignment of the ferrules 60, 60 that could result from attaching and detaching the optical connector 56. As a result, good optical coupling characteristics of the optical link device 1F can be maintained.

Since the receptacle 41 and the sleeve holders 44, 44 are formed in a single unit, the component count may further be reduced.

In addition, because the attachment section 50 is provided on the single unit member 46, and the single unit member 46 joined with the optical communications package 52 is attached to the housing 38 by way of the attachment section 50, the pressure from the ferrules 60, 60 at the time of coupling the optical connector 56 with the optical link device 1F is not carried to the joint between the single unit member 46 and the optical communications package 52. Therefore, the optical communications package 52 can be prevented from becoming out of alignment with respect to the single unit member 46 or from becoming detached altogether.

Figure 20:
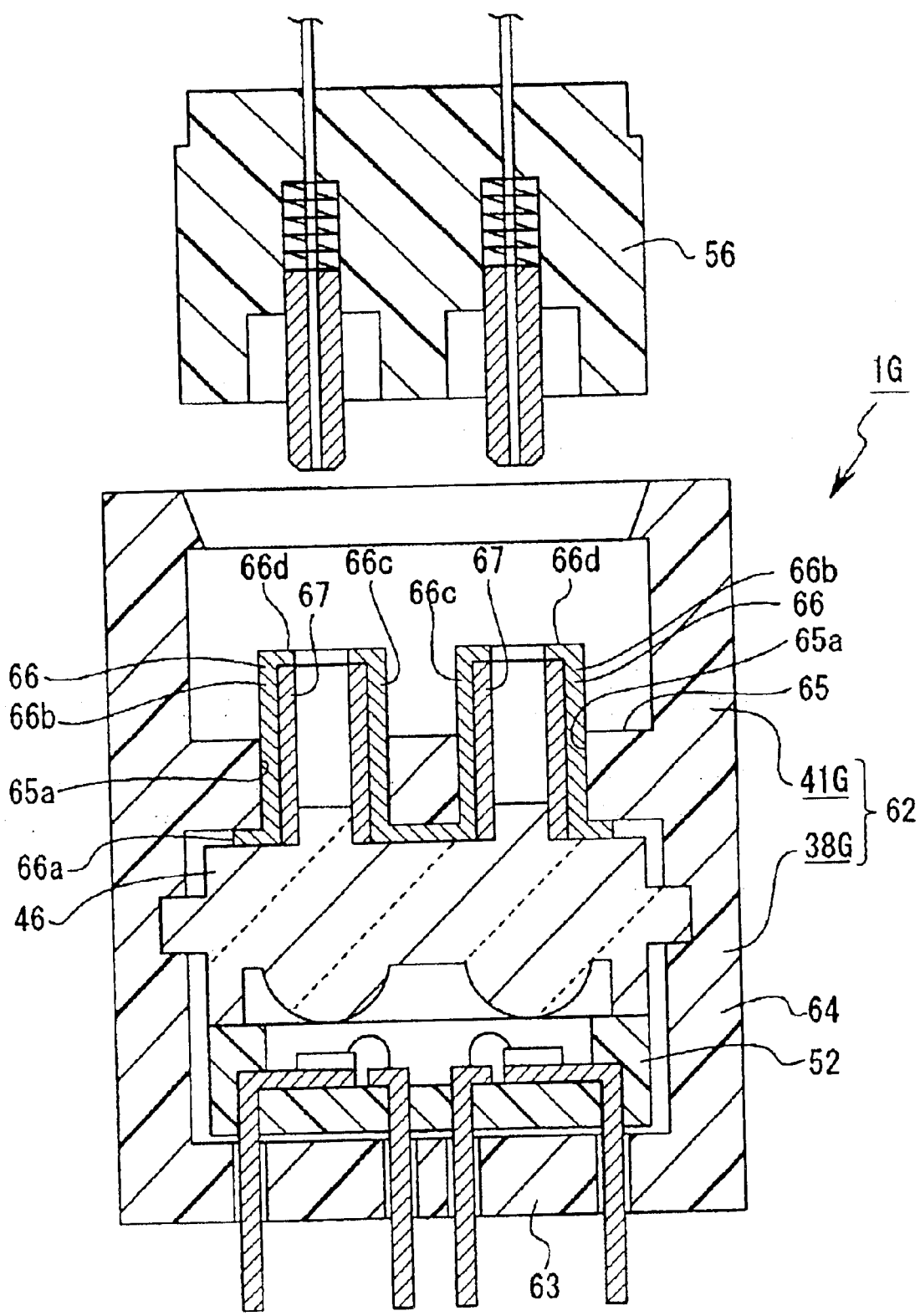
FIG. 20 is an enlarged sectional view of the sixth embodiment.

Next, a sixth embodiment will be described with reference to FIG. 20.

The optical link device 1G of the sixth embodiment differs from the optical link device 1F of the fifth embodiment described above only in that the housing and the receptacle are formed into a single unit, and in that the receptacle and the sleeve holder are separate units. Therefore, only the parts that differ from the optical link device 1F will be described in detail, while the other parts will be assigned the same reference numerals as the comparable parts in the optical link device 1F and description thereof will be omitted.

The optical link device 1G of the sixth embodiment is one in which the functions of the optical link device 1A of the second embodiment are extended, and is equipped with the functions of both a receiver and a transmitter.

In the optical link device 1G, a housing 38G and a receptacle 41G are formed with a resin material and are unitized as a body 62. The body 62 includes a bottom section 63, a circumferential wall section 64 provided so as to stand on the circumferential edge of the bottom section 63, and a closing section 65 that protrudes inward from the circumferential wall section 64 around the middle thereof with respect to the axial direction. The container 62 includes two separate halves that are joined together. The closing section 65 includes sleeve insertion holes 65a, 65a, which are spaced apart from each other.

A sleeve holder 66 is inserted and placed inside each of the sleeve insertion holes 65a, 65a. The sleeve holder 66 includes a flat base section 66a and holders 66b, 66b, which protrude from the base section 66a but are formed apart from each other. The base section 66a and the holders 66b, 66b are formed in a single unit. Each of the holders 66b, 66b includes a cylindrical circumference surface section 66c and an inner flange 66d provided on one end of the circumference surface section 66c. The holders 66b, 66b are inserted into the respective sleeve insertion holes 65a, 65a so as to position the sleeve holder 66, while the base section 66a of the sleeve holder 66 is held between the sealing cap 47 of the single unit member 46 and the closing section 65 of the body 62.

Sleeves 67, 67 are fitted inside the circumference surface sections 66c, 66c of the sleeve holder 66.

As described above, the housing 38G and the receptacle 41G are unitized as the body 62 in the optical link device 1G. As a result, the component count can be reduced, and the work involved in aligning and thereafter securing the various parts can be reduced significantly.

Figure 21:
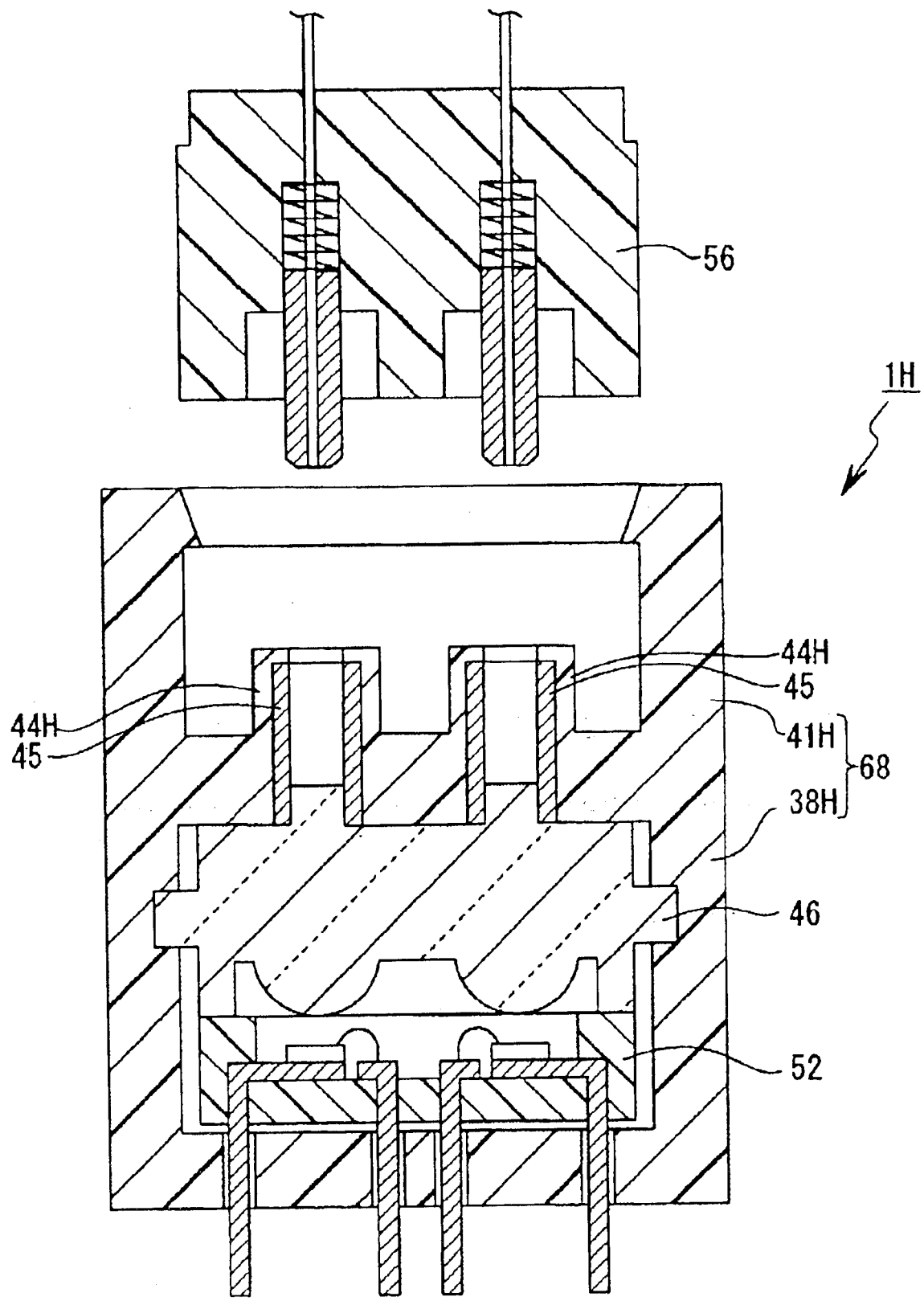
FIG. 21 is an enlarged sectional view of a modification of the sixth embodiment.

A modification of the sixth embodiment will be described next with reference to FIG. 21.

In an optical link device 1H of the modification, a housing, 38H, a receptacle 41H, and sleeve holders 44H, 44H, are formed with a resin material and are unitized as a body 68. For this reason, a further reduction in component count is possible.

Figure 22:
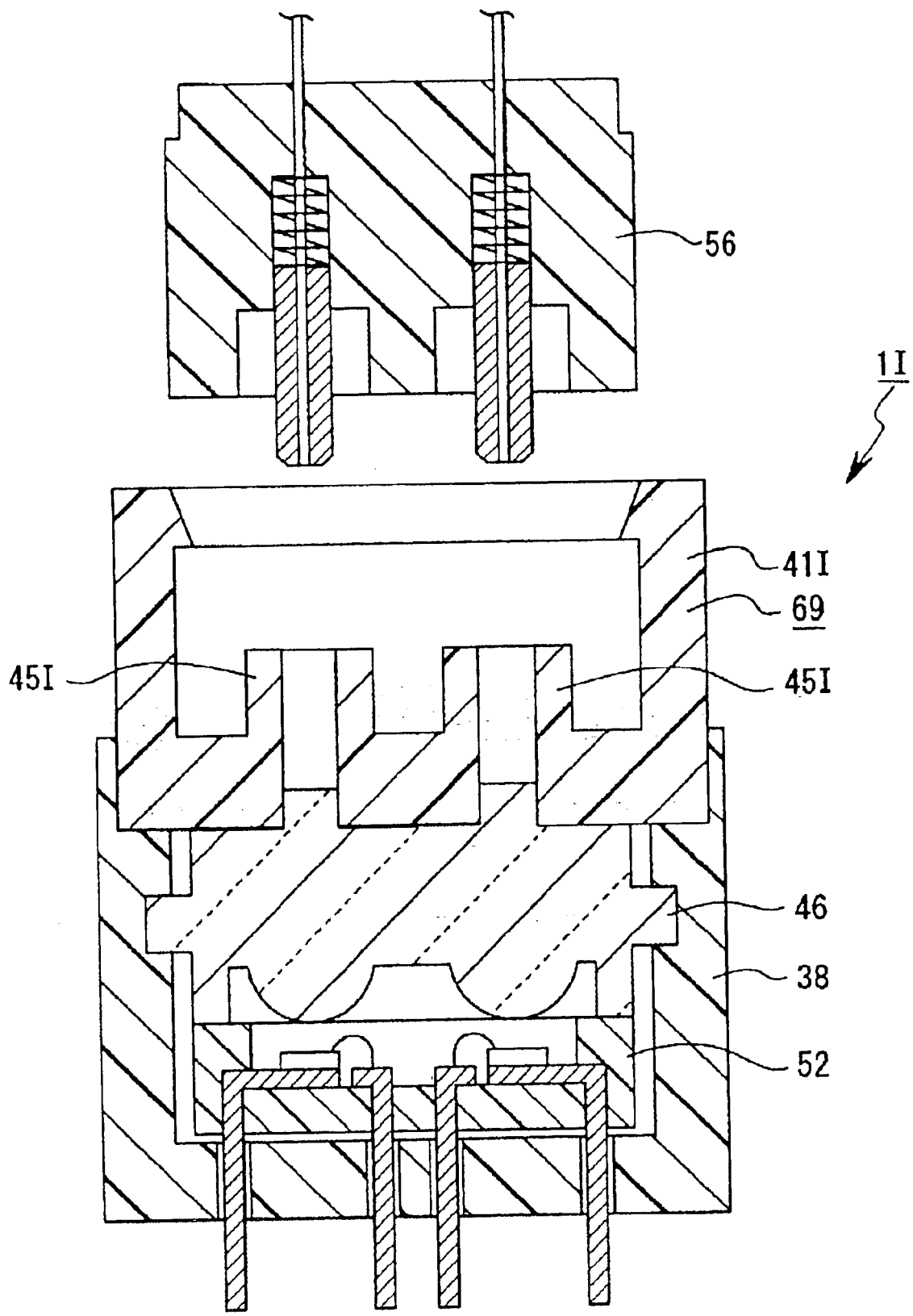
FIG. 22 is an enlarged sectional view of the seventh embodiment.

A seventh embodiment will be described next with reference to FIG. 22.

An optical link device 1I of the seventh embodiment differs from the optical link device 1F of the fifth embodiment only in that the receptacle and the sleeve are formed in a single unit. Therefore, only the parts that differ from the optical link device 1F will be described in detail, while the other parts will be assigned the same reference numerals as those of the corresponding parts in the optical link device 1F and description thereof will herein be omitted.

The optical link device 1I of the seventh embodiment is one in which the features of the optical link device 1C of the third embodiment are expanded, and is equipped with functions of both a receiver and a transmitter.

In the optical link device 1I, a receptacle 41I and sleeves 45I, 45I are formed with a resin material and are unitized as a sleeve-integrated receptacle 69. For this reason, the optical link device 1I does not include a sleeve holder.

The inner diameters of the sleeves 45I, 45I are the same as the outer diameters of the stoppers 48, 48 of the single unit member 46, and the stoppers 48, 48 are fitted inside the sleeves 45I, 45I.

As described above, the receptacle 41I and the sleeves 45I, 45I are unitized as the sleeve-integrated receptacle 69 in the optical link device 1I. As a result, the component count can be reduced, and the work involved in aligning and thereafter securing the various parts can be reduced significantly.

Figure 23:
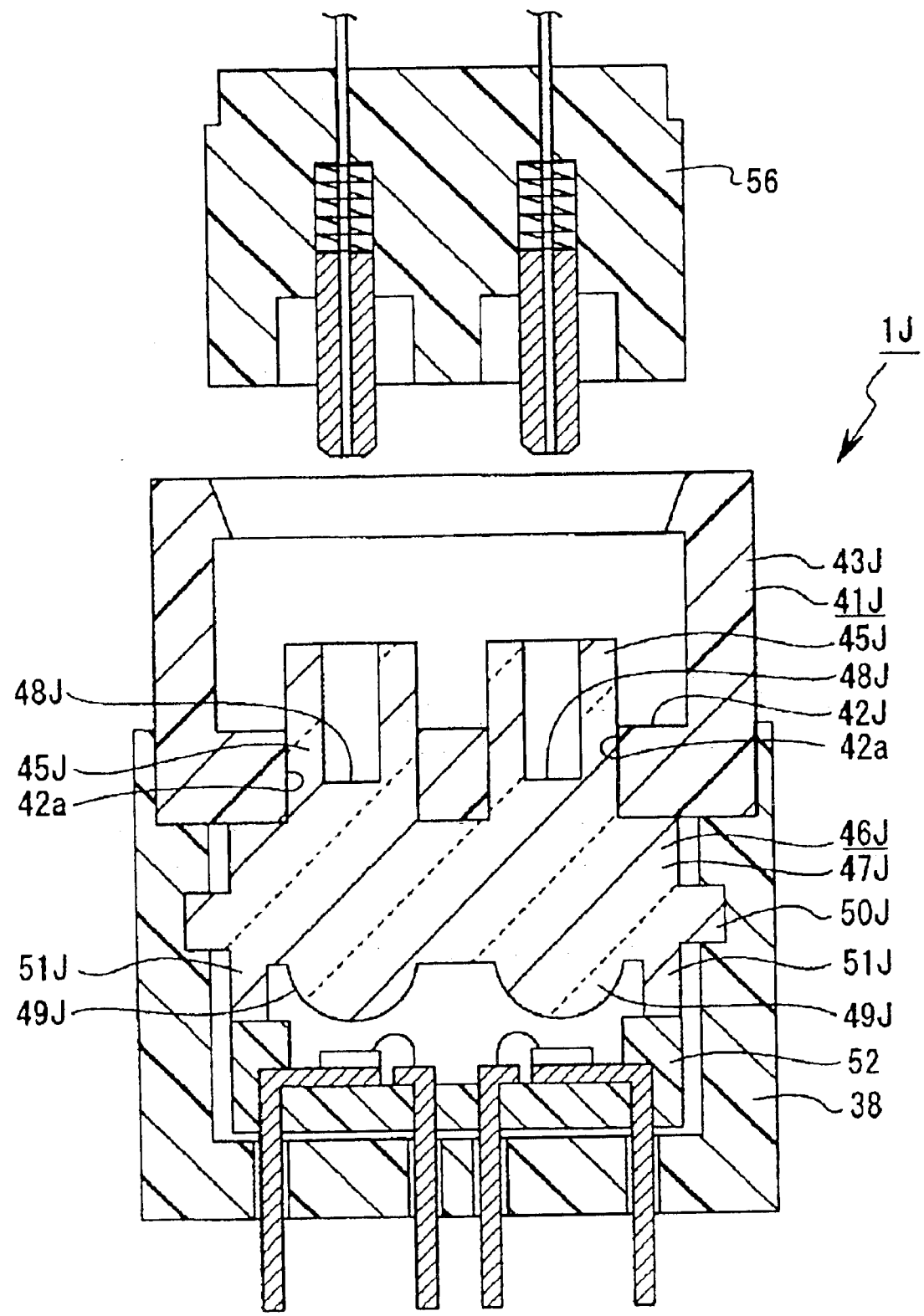
FIG. 23 is an enlarged sectional view of the eighth embodiment.

An eighth embodiment will be described next with reference to FIG. 23.

An optical link device 1J of the eighth embodiment differs from the optical link device 1F of the fifth embodiment only in that the sealing cap, the stoppers, the condenser lenses, and the sleeves are formed in a single unit, and in that the receptacle does not include a sleeve holder. Only the parts that differ from the optical link device 1F will be described in detail, while the other parts will be assigned the same reference numerals as the corresponding parts in the optical link device 1F and description thereof will herein be omitted.

In the optical link device 1J, a sealing cap 47J, stoppers 48J, 48J, condenser lenses 49J, 49J, sleeves 45J, 45J, and an attachment section 50J are unitized as a single unit member 46J, and the sleeves 45J, 45J are formed as part of the stoppers 48J, 48J. A fixing section 51J is formed on the sealing cap 47J.

The receptacle 41J includes a bottom section 42J and a side wall 43J provided so as to stand on the circumferential edge of the bottom section 42J. Sleeve insertion holes 42a, 42a are formed at a center portion of the bottom section 42J. The sleeves 45J, 45J of the single unit member 46J are inserted and positioned inside the sleeve insertion holes 42a, 42a. As such, the optical link device 1J does not include a sleeve holder.

Because the sealing cap 47J, the stoppers 48J, 48J, the condenser lenses 49J, 49J, and the sleeves 45J, 45J, are unitized as the single unit member 46J in the optical link device 1J, the component count can be reduced, and the work involved in aligning and thereafter securing the various parts can also be significantly reduced.

Figure 24:
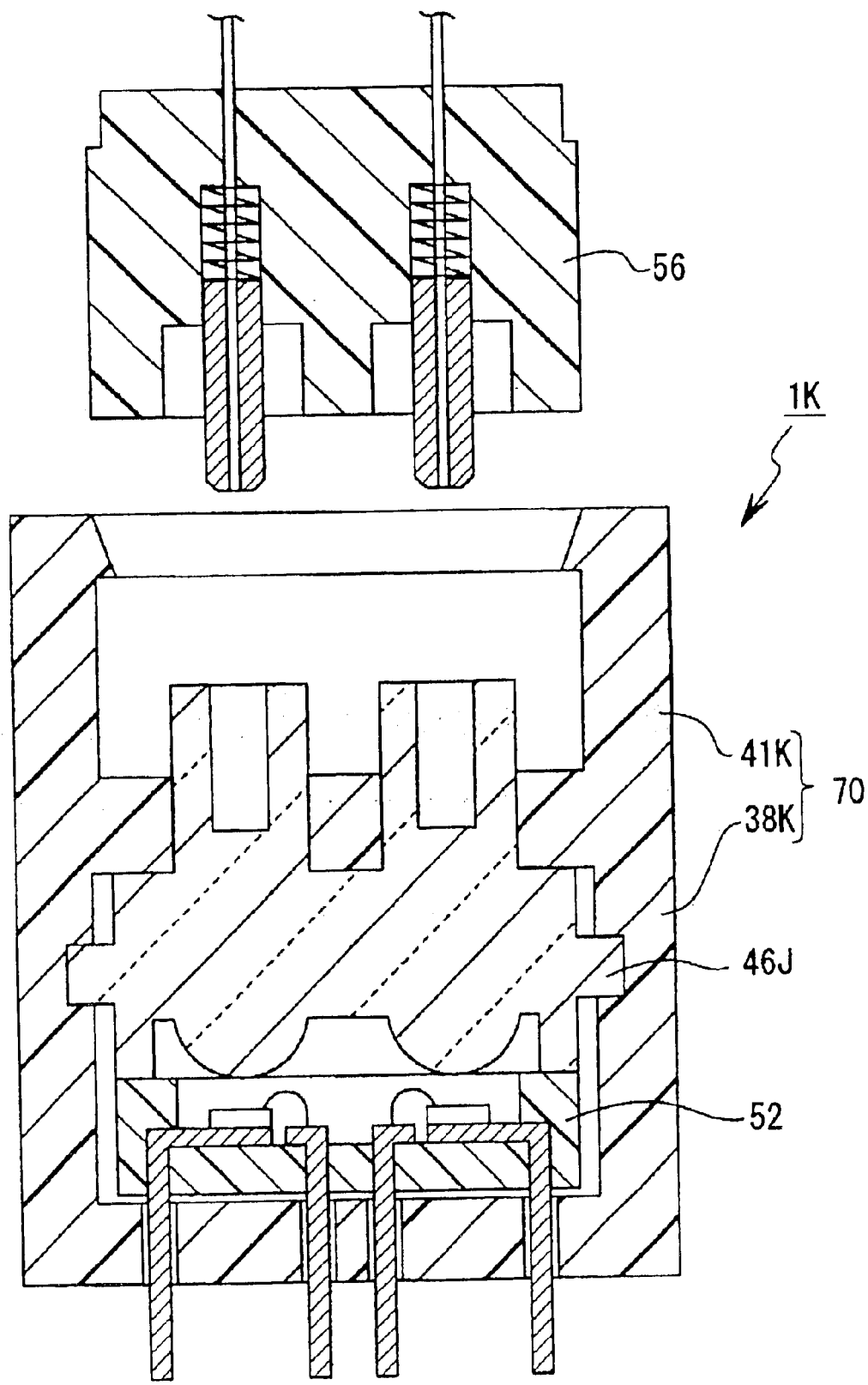
FIG. 24 is an enlarged sectional view of a modification of the eighth embodiment.
Figure 25:
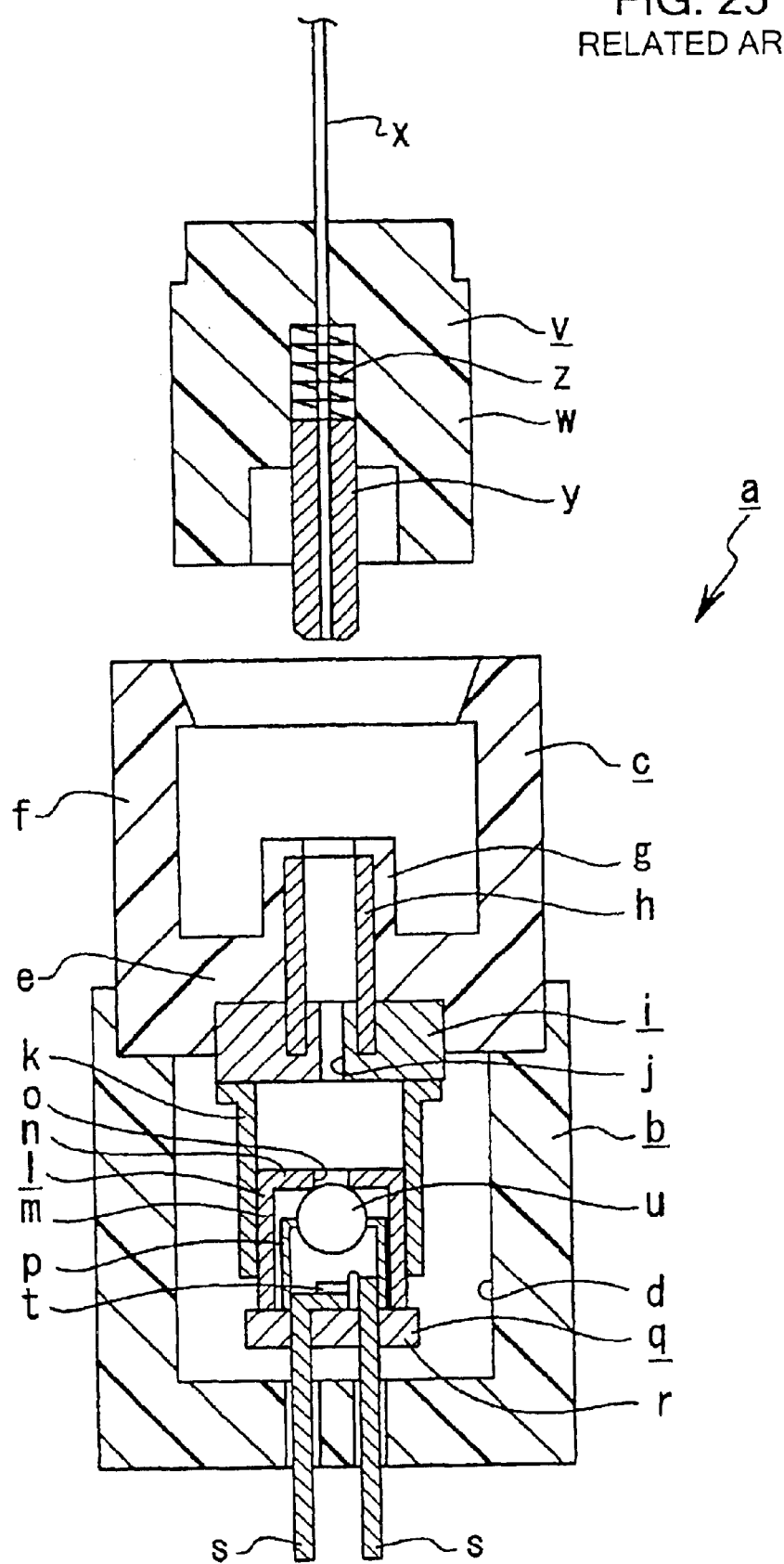
FIG. 25 is an enlarged sectional view of an example of a conventional optical link device.
Figure 26:
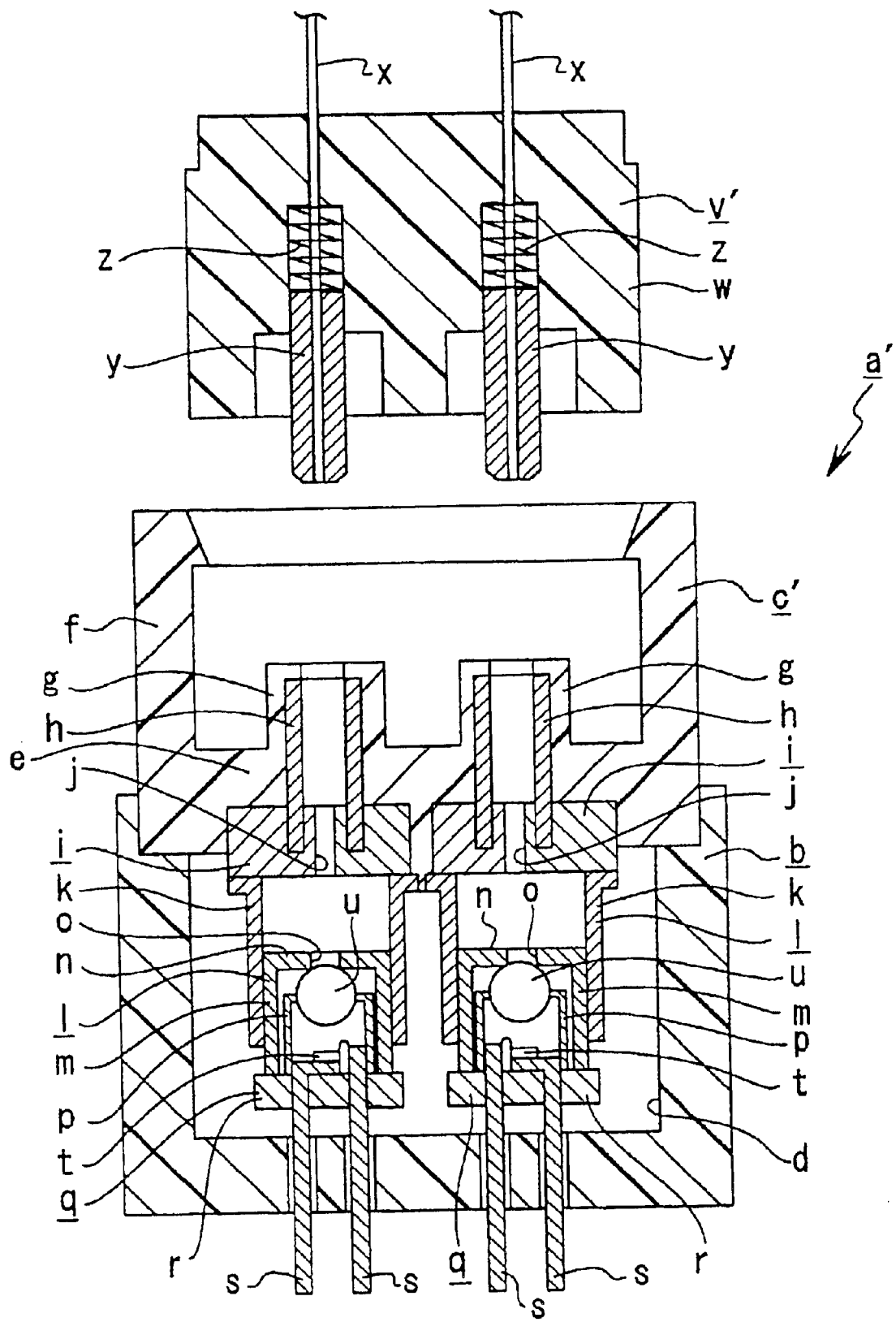
FIG. 26 is an enlarged sectional view of an example of a conventional optical link device for both transmission and reception.

A modification of the eighth embodiment will be described next with reference to FIG. 24.

An optical link device 1K of this modification includes a housing 38K and a receptacle 41K, which are formed with a resin material and are unitized as a body 70. Therefore, a further reduction in component count is possible.

It is to be noted that in the optical link devices 1G, 1H, 1I, 1J, and 1K described above, the attachment of the communications package to the single unit member may be performed through fusing or adhesion using a hot melt adhesive, as shown in FIG. 3 through FIG. 13.

The shapes and structures of the various parts described in the embodiments above only represent a few examples for practicing the present invention, and thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

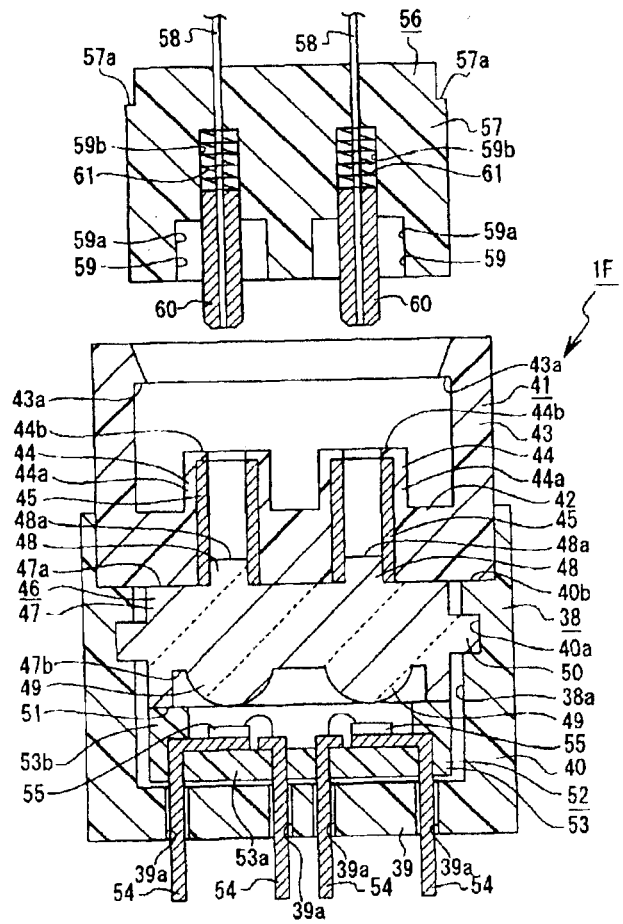

What is claimed is:

1. An optical link device for being connected to an optical connector formed such that an optical fiber is supported by a connector section, said optical link device comprising:

an optical communications package comprising a device positioning member having prescribed wiring patterns, on which one of a light emitting device and a photo detector is placed as a photoelectric converter, and leads for connecting contact terminals of the photoelectric converter to an external device;

a sealing cap that is attached to the device positioning member of the optical communications package and that seals the photoelectric converter in an airtight manner;

a condenser lens that guides incident light to one of the photo detector and the optical fiber;

a housing in which at least the optical communications package, the condenser lens, and the sealing cap are placed;

a receptacle for being coupled with the housing and with the connector section of the optical connector;

a sleeve into which the optical fiber is inserted when the receptacle and the connector section are coupled; and a stopper against which the tip of the optical fiber inserted into the sleeve is butted, and for positioning the optical fiber, wherein the sealing cap, the condenser lens, and the stopper are a single unit member, and an attachment section is formed on the single unit member, and the single unit member is attached to the housing with the attachment section.

2. The optical link device of claim 1, wherein a sleeve holder for holding the sleeve is unitized with the receptacle.

3. The optical link device of claim 1, wherein a sleeve holder for holding the sleeve is unitized with the receptacle.

4. The optical link device of claim 1, wherein the housing and the receptacle are unitized.

5. The optical link device of claim 4, wherein a sleeve holder for holding the sleeve is unitized with the receptacle.

6. The optical link device of claim 1, wherein the housing and the receptacle are unitized.

7. The optical link device of claim 6, wherein a sleeve holder for holding the sleeve is unitized with the receptacle.

8. The optical link device of claim 1, wherein the sleeve and the receptacle are formed into a single unit.

9. The optical link device of claim 1, wherein the sleeve and the receptacle are formed into a single unit.

10. The optical link device of claim 1, wherein the single unit member and the sleeve are formed into a single unit.

11. The optical link device of claim 10, wherein the housing and the receptacle are formed into a single unit.

12. The optical link device of claim 1, wherein the single unit member and the sleeve are formed into a single unit.

13. The optical link device of claim 12, wherein the housing and the receptacle are formed into a single unit.

14. The optical link device of claim 1, wherein the single unit member and the device positioning member of the optical communications package are formed using a resin material, and the sealing cap of the single unit member and the device positioning member are joined together through fusing.

15. The optical link device of claim 14, wherein a part at which the single unit member and the device positioning member of the optical communications package are joined is sealed using a sealing material.

16. The optical link device of claim 14 further comprising a butting section provided on each of the single unit member and the device positioning member of the optical communications package to butt against each other, wherein the sealing cap of the single unit member and the device positioning member are joined together at a part other than the butting sections.

17. The optical link device of claim 1, wherein the single unit member and the device positioning member of the optical communications package are formed using a resin material, and the sealing cap of the single unit member and the device positioning member are joined together with a hot melt adhesive.

18. The optical link device of claim 17, wherein a part at which the single unit member and the device positioning member of the optical communications package are joined is sealed using a sealing material.

19. The optical link device of claim 17 further comprising a butting section provided on each of the single unit member and the device positioning member of the optical communications package to butt against each other, wherein the sealing cap of the single unit member and the device positioning member are joined together at a part other than the butting sections.

20. An optical link device for being connected to an optical connector formed such that a pair of optical fibers are supported by a connecter section, said optical link device comprising:

an optical communications package comprising a device positioning member having prescribed wiring patterns and on which a photo detector and a light emitting device are placed as photoelectric converters, and leads for connecting contact terminals of the photo detector and the light emitting device with an external device;

a sealing cap that is attached to the device positioning member of the optical communications package and that seals the photo detector and the light emitting device airtight;

a pair of condenser lenses that guide incident light to one of the photo detector and the optical fiber;

a housing, in which at least the optical communications package, the pair of condenser lenses, and the sealing cap are placed;

a receptacle for being coupled with the housing and with the connector section of the optical connector;

a pair of sleeves into which the respective optical fibers are inserted when the connector section is coupled with the receptacle; and a pair of stoppers against which the tips of the optical fibers inserted into the respective sleeves are butted and for positioning the pair of optical fibers, wherein the sealing cap, the pair of condenser lenses, and the pair of stoppers are a single unit member, and an attachment section is provided on the single unit member, and the single unit member is attached to the housing with the attachment section.

21. The optical link device of claim 20, wherein a pair of sleeve holders for holding the respective pair of sleeves is unitized with the receptacle.

22. The optical link device of claim 20, wherein a pair of sleeve holders for holding the respective pair of sleeves is unitized with the receptacle.

23. The optical link device of claim 20, wherein the housing and the receptacle are unitized.

24. The optical link device of claim 23, wherein a pair of sleeve holders for holding the respective pair of sleeves is unitized with the receptacle.

25. The optical link device of claim 20, wherein the housing and the receptacle are unitized.

26. The optical link device of claim 25, wherein a pair of sleeve holders for holding the respective pair of sleeves is unitized with the receptacle.

27. The optical link device of claim 20, wherein the pair of sleeves and the receptacle are unitized.

28. The optical link device of claim 20, wherein the pair of sleeves and the receptacle are unitized.

29. The optical link device of claim 20, wherein the single unit member and the pair of sleeves are unitized.

30. The optical link device of claim 29, wherein the housing and the receptacle are unitized.

31. The optical link device of claim 20, wherein the single unit member and the pair of sleeves are unitized.

32. The optical link device of claim 31, wherein the housing and the receptacle are unitized.

33. The optical link device of claim 20, wherein the single unit member and the device positioning member of the optical communications package are formed using resin materials, and the sealing cap of the single unit member and the device positioning member are joined together through fusing.

34. The optical link device of claim 33, wherein a part at which the single unit member and the device positioning member of the optical communications package are joined is sealed using a sealing material.

35. The optical link device of claim 33 further comprising a butting section provided on each of the single unit member and the device positioning member of the optical communications package to butt against each other, wherein the sealing cap of the single unit member and the device positioning member are joined together at a part other than the butting sections.

36. The optical link device of claim 20, wherein the single unit member and the device positioning member of the optical communications package are formed using resin materials, and the sealing cap of the single unit member and the device positioning member are joined together using a hot melt adhesive.

37. The optical link device of claim 36, wherein a part a which the single unit member and the device positioning member of the optical communications package are joined is sealed using a sealing material.

38. The optical link device of claim 36 further comprising a butting section provided on each of the single unit member and the device positioning member of the optical communications package to butt against each other, wherein the sealing cap of the single unit member and the device positioning member are joined together at a part other than the butting sections.

* * * * *

UNITED STATES PATENT AND TRADEMARK OFFICE
CERTIFICATE OF CORRECTION

PATENT NO. : 6,863,452 B2  
APPLICATION NO. : 10/350226  
DATED : March 8, 2005  
INVENTOR(S) : Koji Takada It is certified that error appears in the above-identified patent and that said Letters Patent is hereby corrected as shown below:

In Column 26:
Please cancel claim 3, Lines 19, 20 and 21, claim 6, Lines 26 and 27, claim 9, Lines 32 and 33, and claim 12, Lines 38 and 39 as duplicative of claim 1, col. 25, Lines 1-17, claim 2, col. 26, Lines 18-19, claim 4, col. 26, Lines 22-23 and claim 8, col. 26, Lines 30-31.

In Column 28:
Please cancel claim 28, Lines 8-9 and claim 31, Lines 14-15 as duplicative of claim 27, Lines 6-7 and claim 29, Lines 10-11.

Signed and Sealed this  
Third Day of April, 2012

David J. Kappos  
*Director of the United States Patent and Trademark Office*

UNITED STATES PATENT AND TRADEMARK OFFICE
CERTIFICATE OF CORRECTION

PATENT NO.       : 6,863,452 B2  
APPLICATION NO.  : 10/350226  
DATED            : March 8, 2005  
INVENTOR(S)      : Koji Takada Page 1 of 2

It is certified that error appears in the above-identified patent and that said Letters Patent is hereby corrected as shown below:

Delete the title page and substitute therefore the attached title page showing the corrected number of claims in patent.

In Column 26:
Please cancel claim 3, Lines 19, 20 and 21, claim 6, Lines 26 and 27, claim 9, Lines 32 and 33, and claim 12, Lines 38 and 39 as duplicative of claim 1, col. 25, Lines 1-17, claim 2, col. 26, Lines 18-19, claim 4, col. 26, Lines 22-23 and claim 8, col. 26, Lines 30-31.

In Column 28:
Please cancel claim 28, Lines 8-9 and claim 31, Lines 14-15 as duplicative of claim 27, Lines 6-7 and claim 29, Lines 10-11.

This certificate supersedes the Certificate of Correction issued April 3, 2012.

Signed and Sealed this  
Twenty-second Day of May, 2012

David J. Kappos  
*Director of the United States Patent and Trademark Office*

(12) United States Patent
Takada

(10) Patent No.: US 6,863,452 B2
(45) Date of Patent: Mar. 8, 2005

(54) OPTICAL LINK DEVICE

(75) Inventor: Koji Takada, Kanagawa (JP)

(73) Assignee: Sony Corporation (JP)

( * ) Notice: Subject to any disclaimer, the term of this patent is extended or adjusted under 35 U.S.C. 154(b) by 86 days.

(21) Appl. No.: 10/350,226

(22) Filed: Jan. 24, 2003

(65) Prior Publication Data

US 2003/0147602 A1 Aug. 7, 2003

(30) Foreign Application Priority Data

Feb. 1, 2002 (JP) .................................. P2002-025030

(51) Int. Cl.⁷ .............................................. G02B 6/36
(52) U.S. Cl. ................................................... 385/93
(58) Field of Search .......................... 385/93, 92, 94, 385/76

*Primary Examiner*—Chau N. Nguyen
(74) *Attorney, Agent, or Firm*—Rader, Fishman & Grauer PLLC; Ronald P. Kananen

(57) ABSTRACT

An optical link device is provided with an optical communications package including a device positioning member, a photoelectric converter placed on the device positioning member, and leads for connecting contact terminals of the photoelectric converter with an external device; a sealing cap attached to the device positioning member and which seals the photoelectric converter; a condenser lens for guiding incident light to a photo detector (the photoelectric converter) or an optical fiber; a housing in which at least the optical communications package, the condenser lens and the sealing cap are placed; a receptacle for being coupled with the optical connector; a sleeve into which the optical fiber is inserted; a stopper against which the tip of the optical fiber is butted and for positioning the optical fiber. The sealing cap, the condenser lens, and the stopper are formed in a single unit member.

32 Claims, 21 Drawing Sheets